(12) United States Patent
Suzuki et al.

(10) Patent No.: US 10,530,994 B2
(45) Date of Patent: Jan. 7, 2020

(54) IMAGE CAPTURE APPARATUS, CONTROL METHOD FOR IMAGE CAPTURE APPARATUS AND NON-TRANSITORY RECORDING MEDIUM FOR COMBINING IMAGE

(71) Applicant: CANON KABUSHIKI KAISHA, Tokyo (JP)

(72) Inventors: Takayuki Suzuki, Kawasaki (JP); Yoichi Takahashi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 15/709,241

(22) Filed: Sep. 19, 2017

(65) Prior Publication Data

US 2018/0084192 A1    Mar. 22, 2018

(30) Foreign Application Priority Data

Sep. 21, 2016  (JP) ................................. 2016-183798
Sep. 29, 2016  (JP) ................................. 2016-191331

(51) Int. Cl.
*H04N 5/232*   (2006.01)
*H04N 5/265*   (2006.01)

(52) U.S. Cl.
CPC ..... *H04N 5/23229* (2013.01); *H04N 5/23212* (2013.01); *H04N 5/23251* (2013.01); *H04N 5/23267* (2013.01); *H04N 5/265* (2013.01)

(58) Field of Classification Search
CPC ......... H04N 5/23229; H04N 5/232125; H04N 5/232133; H04N 5/232122; H04N 5/23267; H04N 5/23251; H04N 5/265; H04N 5/23212
See application file for complete search history.

(56) References Cited

U.S. PATENT DOCUMENTS

| 9,473,698 | B2 * | 10/2016 | Muto | H04N 5/23229 |
| 2018/0075617 | A1 * | 3/2018 | Abe | G06T 5/50 |
| 2019/0028653 | A1 * | 1/2019 | Minami | G02B 7/28 |

FOREIGN PATENT DOCUMENTS

| CN | 102801929 A | 11/2012 |
| CN | 103152520 A | 6/2013 |
| CN | 104270560 A | 1/2015 |
| JP | 2002-084444 A | 3/2002 |

* cited by examiner

*Primary Examiner* — Padma Haliyur
(74) *Attorney, Agent, or Firm* — Canon U.S.A., Inc. IP Division

(57) ABSTRACT

An image capture apparatus sets a plurality of target focus positions, causes an image sensor to capture a plurality of images based on the target focus positions, and calculates focus positions with respect to an object of a plurality of captured images. In a case where the image capture apparatus captures a first image and a second image sequentially and where a difference between a focus position calculated for capturing the first image and a focus position calculated for capturing the second image is higher than a predetermined threshold value, the image capture apparatus resets a part of the target focus positions for images to be captured subsequently.

21 Claims, 23 Drawing Sheets

FIG. 8A
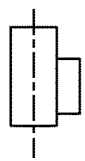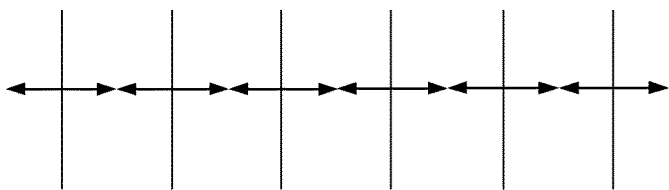
FIG. 8B
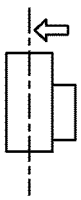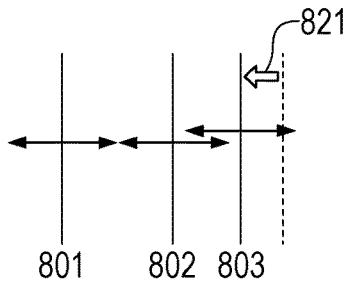
FIG. 8C
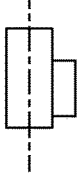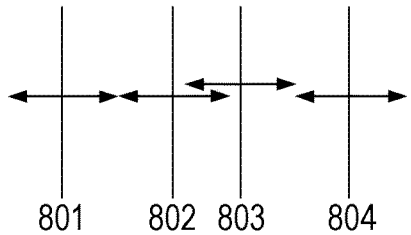
FIG. 8D
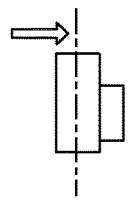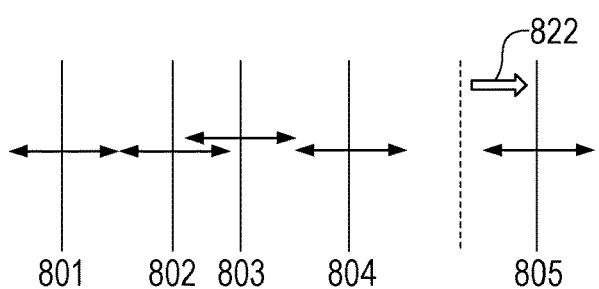
FIG. 8E
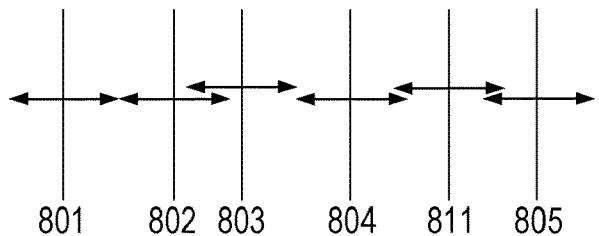
FIG. 8F
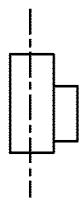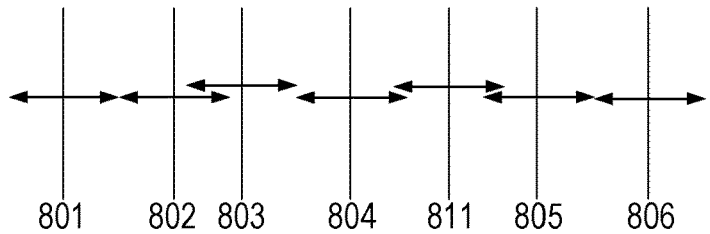

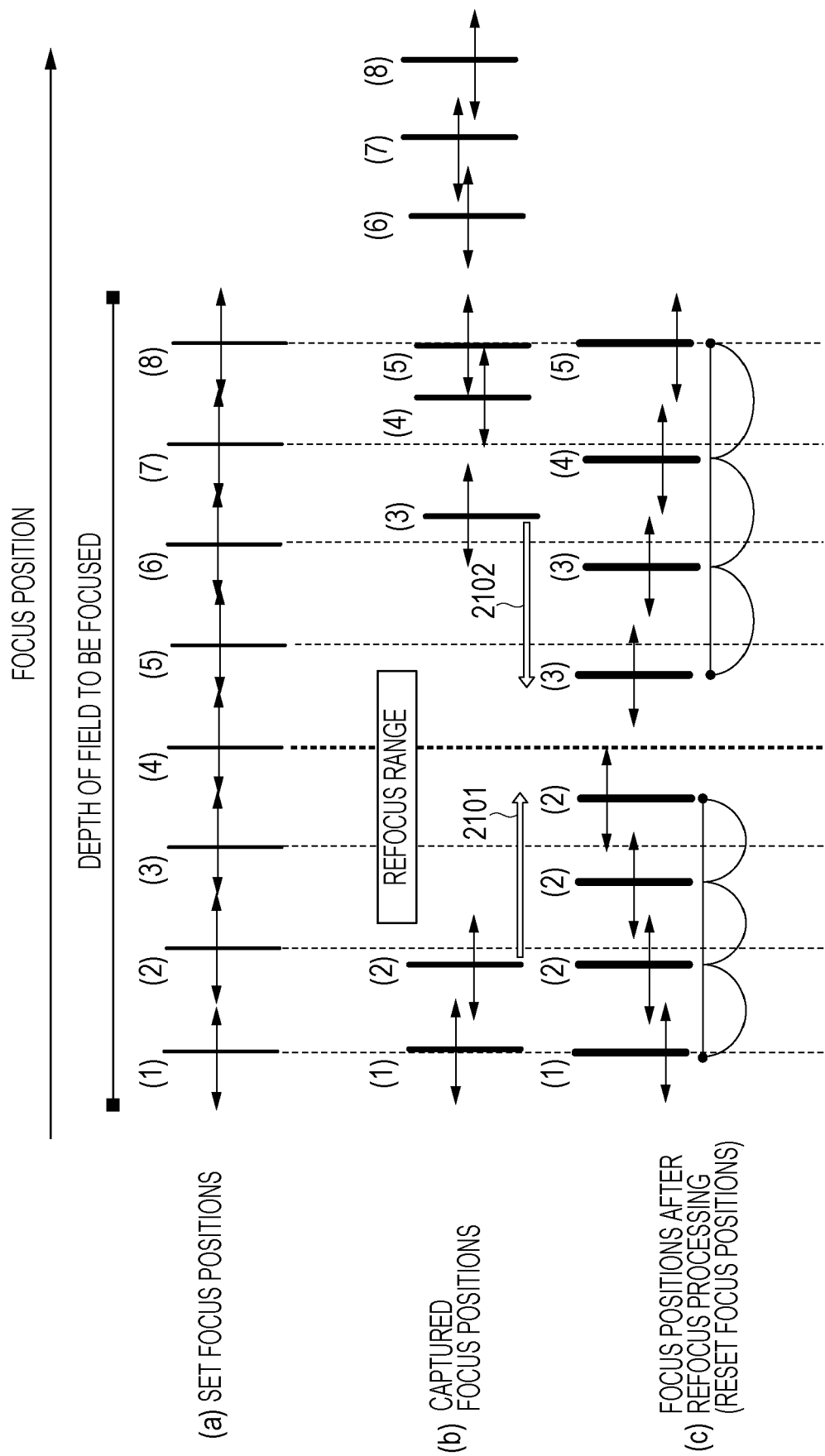

IMAGE CAPTURE APPARATUS, CONTROL METHOD FOR IMAGE CAPTURE APPARATUS AND NON-TRANSITORY RECORDING MEDIUM FOR COMBINING IMAGE

BACKGROUND OF THE INVENTION

Field of the Invention

The present invention relates to an image capture apparatus configured to combine images.

Description of the Related Art

When a plurality of objects at different distances from a camera is to be captured or when an object that is long in a depth direction is to be captured, only a part of the object or objects may be brought into focus because there is an insufficient depth of field in the imaging optical system.

Accordingly, a technology (hereinafter, also called focus stacking) (refer to Japanese Patent Laid-Open No. 2002-84444) has been known which captures a plurality of images by changing focus positions, extracts in focus regions from the images, and combines them into one image to generate a combined image in which the entire captured region is in focus. The focus stacking technology may be used to acquire an image in which an intended object is entirely in-focus.

However, when camera shake occurs during an image capturing operation by applying the focus stacking technology, the following problem may occur.

FIGS. 22A to 22C illustrate camera shake in focus stacking. FIG. 22A illustrates image capturing by using ideal focus stacking. Referring to FIG. 22A, a user places a digital camera at a position 2201, and the camera is operated to perform capturing a plurality of number of times by moving a focus position of the camera by a predetermined distance 2202.

FIG. 22B illustrates a case where camera shake occurs when the third image is captured in the imaging illustrated in FIG. 22A. Moving an image capturing position 2201 backward in an optical axis direction may bring a focus position at a shorter distance than the distance in which image capturing should originally be performed. Referring to FIG. 22C, when four images are captured, camera shake may occur in the direction opposite against the direction of the camera shake in FIG. 22B. In this case, the four images are captured at farther positions than the focus position where the images should originally be captured. Combining the plurality of images captured as in FIG. 22C may result in a combined image having a blurred part without a focused image in a region 2203.

The present disclosure is provided in view of the problem.

SUMMARY OF THE INVENTION

Embodiments of the invention provide an image capture apparatus which can generate a combined image having reduced camera shake due to camera shake when a plurality of images captured at different focus positions are to be combined. An image capture apparatus according to embodiments of the present invention includes an image sensor, a processor, and a memory including instructions that, when executed by the processor, cause the processor to set a plurality of target focus positions, cause the image sensor to capture a plurality of images based on the target focus positions, and calculate a focus position with respect to an object when each of the plurality of images is captured. In this case, the instructions further cause the processor to reset at least a part of the target focus positions based on a result of a comparison between the target focus positions and the calculated focus positions.

An image capture apparatus according to embodiments of the present invention includes an image sensor having a sensor array having a plurality of photoelectric conversion units for one microlens, a processor, and a memory including instructions that, when executed by the processor, cause the processor to set a plurality of target focus positions, cause the image sensor to capture a plurality of images based on the target focus positions, and calculate a focus position with respect to an object when each of the plurality of images is captured. In this case, the instructions further cause the processor to reconstruct an image focused with respect to at least one target focus position by using at least a part of the plurality of images based on a difference between the plurality of target focus positions and the focus positions calculated with respect to the plurality of images.

Further features of the present invention will become apparent from the following description of exemplary embodiments with reference to the attached drawings.

BRIEF DESCRIPTION OF THE DRAWINGS

FIG. 8A illustrates a state in which camera shake does not occur in focus stacking according to the first embodiment.

FIG. 8B illustrates a state in which camera shake occurs in a forward side in an optical axis direction in focus stacking according to the first embodiment.

FIG. 8C illustrates a state in which camera shake occurs in a forward side in an optical axis direction in focus stacking according to the first embodiment.

FIG. 8D illustrates a state of a correction example to be performed when camera shake occurs on an infinite end side of the optical axis in focus stacking according to the first embodiment.

FIG. 8E illustrates another correction example to be performed when camera shake occurs on an infinite end side of the optical axis in focus stacking according to the first embodiment.

FIG. 8F illustrates another correction example to be performed when camera shake occurs on an infinite end side of the optical axis in focus stacking according to the first embodiment.

FIG. 21 illustrates examples of resetting of a focus position and subsequent refocusing in a case where it is determined in the step that refocusing is not possible according to the fourth embodiment.

DESCRIPTION OF THE EMBODIMENTS

With reference to the attached drawings, embodiments of the present invention will be described in detail below. A digital camera will be described below as an example, but the present disclosure is applicable to any image capture apparatus capable of adjusting a focus position.

First Embodiment

Figure 1:
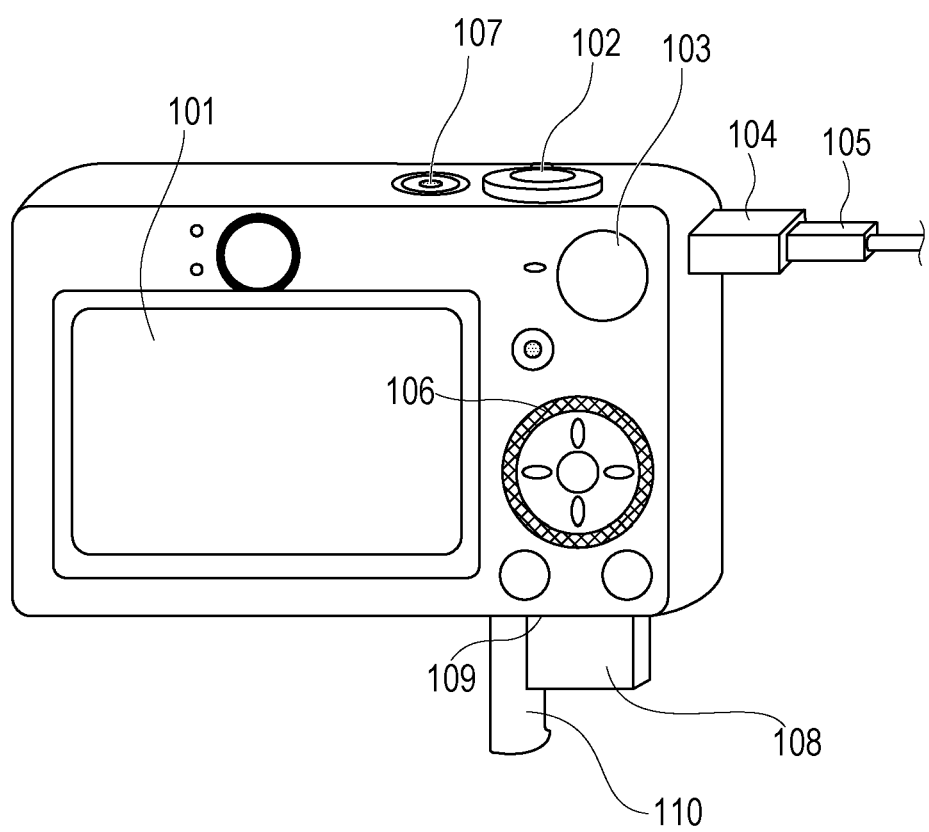
FIG. 1 illustrates an outer appearance of a digital camera being an example of an image capture apparatus according to an embodiment of the present invention.

FIG. 1 illustrates an outer appearance of a digital camera as an example of an image capture apparatus according to a first embodiment. A monitor 101 is configured to display an image and information. A shutter button 102 is provided for giving image-capturing instruction. A mode selection switch 103 is provided for changing a mode. A connector 104 is configured to connect a connection cable 105 and the digital camera. A controller wheel 106 is an operating member which can be rotatably operated. A switch 107 is a power switch and is usable for switching between powering on and powering off. A memory card 108 is a recording medium. A slot 109 is a slot for storing the memory card 108. The memory card 108 stored in the slot 109 can communicate with a main body of the digital camera. A lid 110 is for the slot 109.

Figure 2:
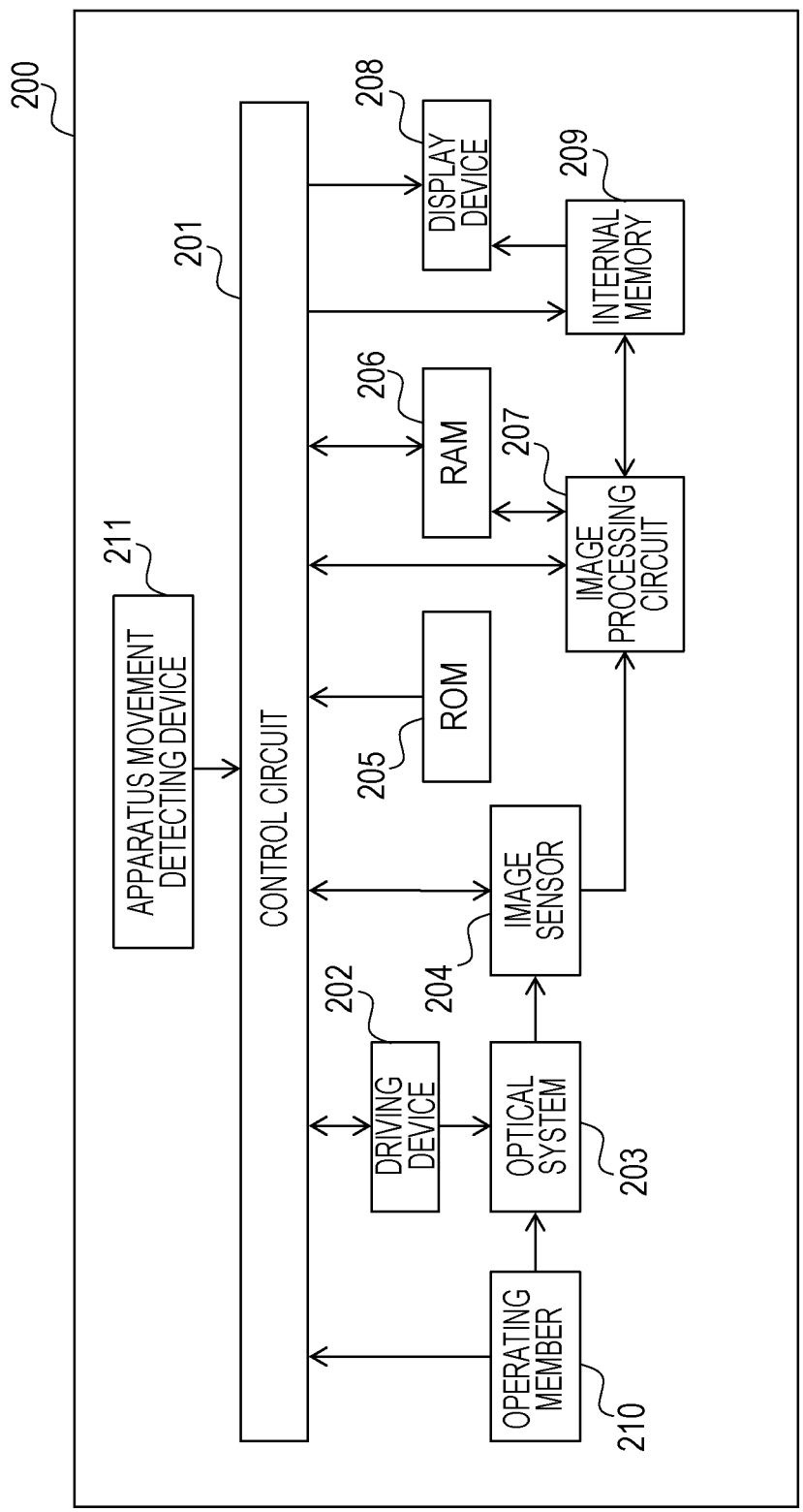
FIG. 2 is a block diagram illustrating a structure of the digital camera according to an embodiment of the present invention.

FIG. 2 is a block diagram illustrating a structure of the digital camera according to this embodiment. The digital camera 200 can capture still images and can record information regarding focus positions, calculate contrast values, and can combine the images. The digital camera 200 can perform enlargement processing and reduction processing on a captured and saved image and an externally input image.

A control circuit 201 may be a signal processor such as a CPU and an MPU and control components of the digital camera 200 by pre-reading programs contained in a ROM 205, which will be described below. For example, the control circuit 201 may transmit a command associated with termination and completion of image-capturing to the image sensor 204, as will be described below. Alternatively, a command associated with an image process is transmitted to the image processing circuit 207, as will be described below, based on settings prepared in advance. A user's command is input to the digital camera 200 by an operating member 210, which will be described below, and reaches the corresponding components of the digital camera 200 through the control circuit 201.

A driving device 202 may include a motor, for example, and causes an optical system 203, which will be described below, to mechanically operate based on a command from the control circuit 201. For example, based on a command from the control circuit 201, the driving device 202 moves the position of a focus lens included in the optical system 203 to adjust the focal length of the optical system 203.

The optical system 203 may include a zoom lens, a focus lens, and a diaphragm, for example. The diaphragm is a mechanism configured to adjust the quantity of transmitted light. Changing the position of the lens can change the focus position. However, the term "focus position" here is defined with reference to an object unless otherwise specified.

The image sensor 204 is a photoelectric converter and may perform photoelectric conversion including photoelectrically converting an input optical signal to an electrical signal. For example, a CCD or a CMOS sensor is applicable as the image sensor 204. The structure of the image sensor will be described in detail below. The image sensor 204 has a movement image capturing mode and can capture a plurality of images that are serial in time as frames of a movement image.

The ROM 205 is a read-only non-volatile memory being a recording medium and stores operating programs for blocks included in the digital camera 200 and parameters for operations of the blocks. A RAM 206 is a re-writable volatile memory is usable as a temporary storage area for data output by operations performed by blocks included in the digital camera 200.

An image processing circuit 207 is configured to perform various image processes such as white balance adjustment, color interpolation, and filtering on data of an image output from the image sensor 204 or an image signal recorded in an internal memory 209, which will be described below. The image processing circuit 207 is further configured to perform a compression process based on a standard such as JPEG on data of an image signal captured by the image sensor 204.

The image processing circuit 207 includes an integrate circuit (ASIC) including circuits configured to perform specific processes. Alternatively, the control circuit 201 may perform a process based on a program read out from the ROM 205 so that the control circuit 201 can also use a part or all of functions of the image processing circuit 207. When the control circuit 201 uses all functions of the image processing circuit 207, the necessity for providing the image processing circuit 207 as hardware may be eliminated.

A display device 208 may be a liquid crystal display or an organic electroluminescence display configured to display an image temporarily saved in the RAM 206, an image saved in an internal memory 209, which will be described below, or a setting screen for the digital camera 200. The monitor 101 illustrated in FIG. 1 corresponds to the display device 208.

The internal memory 209 is configured to store an image captured by the image sensor 204, an image having undergone a process in the image processing circuit 207, and information regarding a focus position for image capturing. Instead of such an internal memory, the memory card 108 as illustrated in FIG. 1 may be used.

The operating member 210 may be a button, a switch, a key, a mode dial or the like attached to the digital camera 200 or a touch panel which is also used as the display device 208. A command from a user reaches the control circuit 201 through the operating member 210. The shutter button 102, the mode selection switch 103, the controller wheel 106 and the switch 107 illustrated in FIG. 1 correspond to the operating member 210.

An apparatus movement detecting device 211 may be a gyro sensor and is configured to detect a movement of the digital camera 200 and to detect a movement in a yaw direction and a pitch direction based on a change in angle per unit time, that is, an angular velocity of the digital camera 200.

Figure 3A:
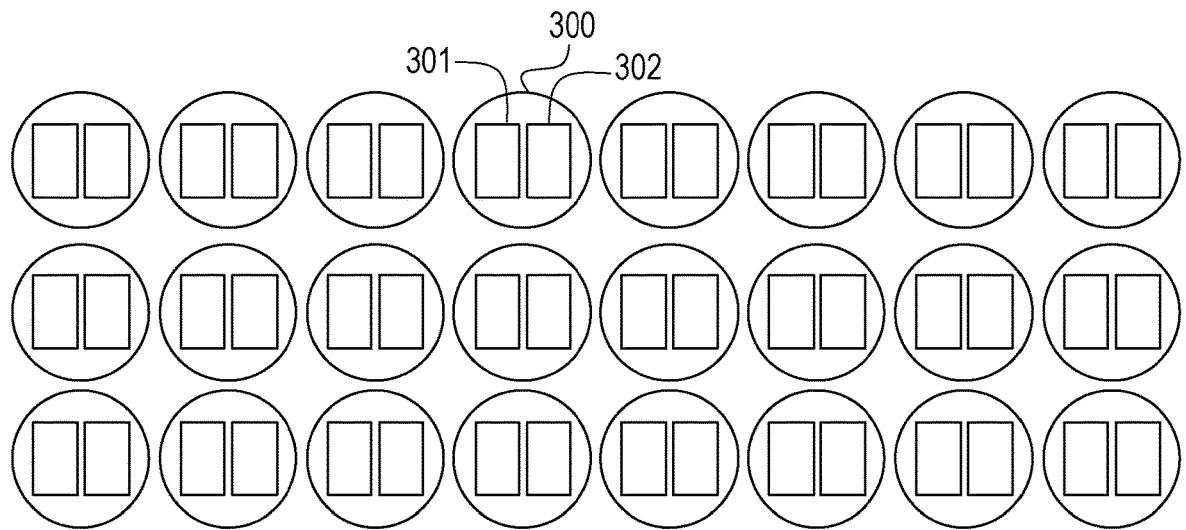
FIG. 3A illustrates a structure of an image capture device having two photoelectric conversion units in one pixel according to a first embodiment.
Figure 3B:
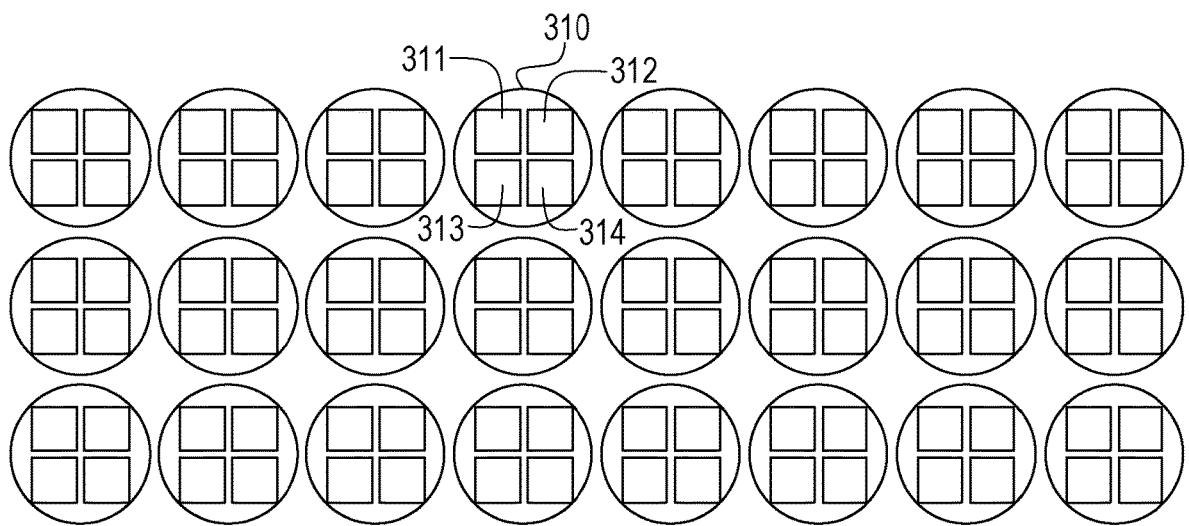
FIG. 3B illustrates a structure of an image capture device having four photoelectric conversion units in one pixel according to the first embodiment.

FIGS. 3A and 3B illustrate an array of sensors included in the image sensor 204 according to this embodiment. FIG. 3A illustrates pixels 300 each having two photoelectric conversion units 301 and 302 which can read optical signals independently from each other. However, each of the pixels may have a structure having three or more photoelectric conversion units. For example, FIG. 3B illustrates pixels 310 each having a structure having four photoelectric conversion units 311 to 314. The following description is based on a structure in which one pixel has two photoelectric conversion units.

Figure 4:
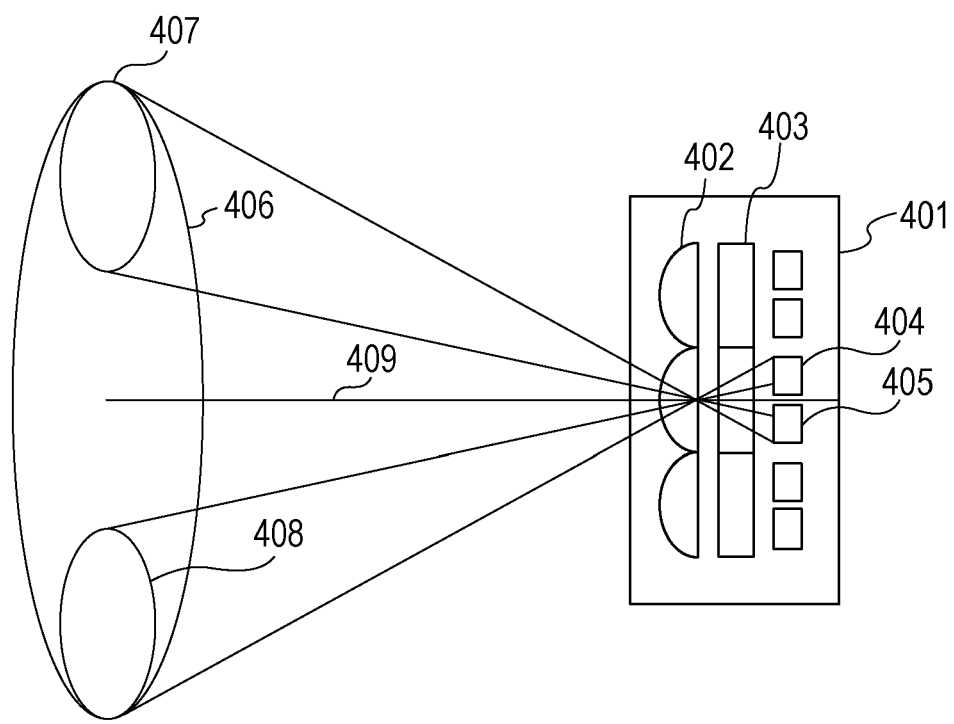
FIG. 4 illustrates input of an optical signal to a pixel according to the first embodiment.

FIG. 4 illustrates input of an optical signal to a pixel according to this embodiment.

Referring to FIG. 4, a pixel array 401 has a microlens 402, a color filter 403, and photoelectric conversion units 404 and 405. The photoelectric conversion units 404 and 405 belong to one identical pixel and correspond to the microlens 402 and the color filter 403. FIG. 4 is an upper view of the digital camera illustrating the horizontally arranged two photoelectric conversion units 404 and 405 corresponding to one pixel. Of light fluxes emitted from the exit pupil 406, about an optical axis 409 as a boundary, an upper light flux (corresponding to a light flux from a region 407) enters to the photoelectric conversion unit 405, and a lower light flux (corresponding to a light flux from a region 408) enters to the photoelectric conversion unit 404. In other words, the photoelectric conversion units 404 and 405 receive light fluxes from different regions of the exit pupil of the imaging lens. In a case where a signal received from the photoelectric conversion unit 404 corresponds to an image A and a signal received from the photoelectric conversion unit 405 corresponds to an image B, the control circuit 201 can calculate a defocus amount based on a phase difference between the image A and the image B to acquire distance information.

Figure 5:
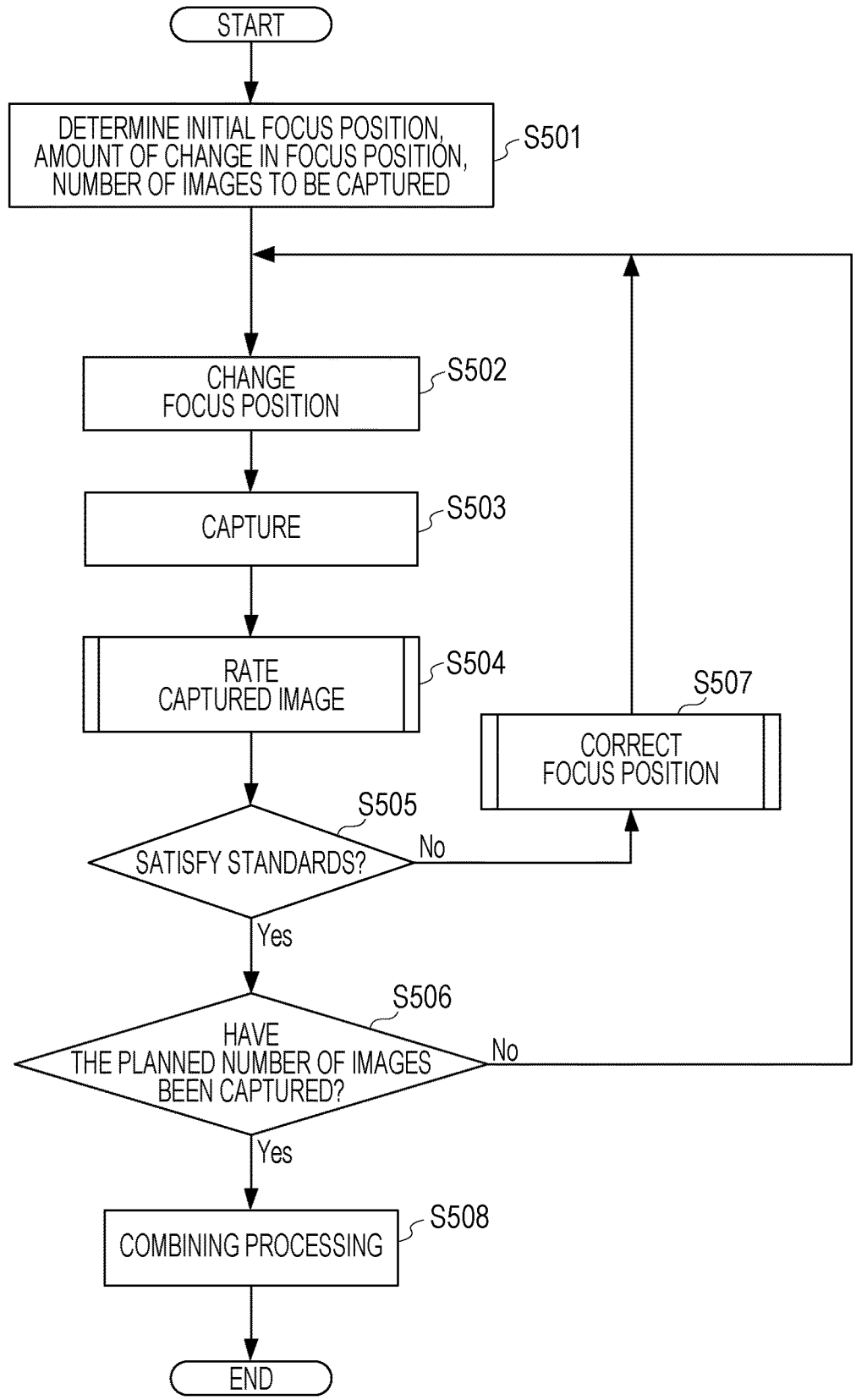
FIG. 5 is a flowchart illustrating focus stacking processing according to the first embodiment.

FIG. 5 is a flowchart illustrating focus stacking processing according to this embodiment.

The focus stacking processing is started with reach of a command from a user to the control circuit 201 through the operating member 210. The control circuit 201 in step S501 sets a focus position for capturing the first image based on the depth of object of the digital camera 200, an amount of change in focus position between images for capturing the second and subsequent images, and the number of images to be captured. With those values, a plurality of focus positions is calculated and is set. Next, in step S502, the control circuit 201 moves a lens included in the optical system 203 to change the focus position of the digital camera 200. For the first image, the lens is moved to the preset focus position. For the second and subsequent images, the lens is moved to a focus position on the most minimum-object-distance side or infinite end side among focus positions where a capturing operation has not been performed yet of the preset focus positions. In step S503, the image sensor 204 is controlled to perform a capturing operation. The control circuit 201 in step S504 rates on the images captured in step S503. The rating to be performed on captured images will be described in detail below.

In step S505, the control circuit 201 determines whether the captured images satisfy standards or not. If they satisfy standards, the processing moves to step S506 where whether the set number of images have been captured is determined.

If the control circuit 201 in step S505 determines that the captured images do not satisfy standards, the focus position set for the next capturing operation is corrected in step S507, and the processing returns to step S502. The correction of the set focus position in step S507 will be described in detail below.

If it is determined in step S506 that the set number of images have been captured, the control circuit 201 in step S508 performs a combining process to generate a combined image. If it is determined in step S506 that the set number of images have not been captured, the processing returns to step S502.

The combining of images in step S508 may be based on a publicly known method, and an example thereof will be described below. First, for alignment, a sum of absolute differences (SAD) of outputs of pixels of two images is acquired by changing the relative position between the plurality of images. The relative moving amount and the moving direction of the two images are acquired for a lowest value of the sum of absolute differences. Then, after a transform coefficient for an affine transformation or a projective transformation based on the acquired moving amount and moving direction is calculated, the transform coefficient is optimized by using the least squares method such that the error between the moving amount provided with the transform coefficient and the moving amount calculated from the sum of absolute differences can be minimized. Based on the optimized transform coefficient, a deformation process is performed on the images to be aligned. The image processing circuit 207 performs the alignment and the deformation process on all of the images captured by the image sensor 204 in step S503, and a combination ratio is then given to each of regions of each of the images. As an example, among a plurality of images corresponding to one identical region, the image processing circuit 207 gives a combination ratio of 100% to pixels included in the identical region of an image having an in-focus region and gives a combination ratio of 0% to pixels included in the identical region of other images. Alternatively, based on the in focus degrees of images of regions, a combination ratio may be assigned to the in-focus region of each of the images. In order to prevent unnaturalness at the combination boundaries, the image processing circuit 207 changes the combination ratio between adjacent pixels in stepwise manner. Finally, based on the combination ration of the pixels, a combined image is generated.

Next, the rating of captured images in step S504 will be described.

Figure 6:
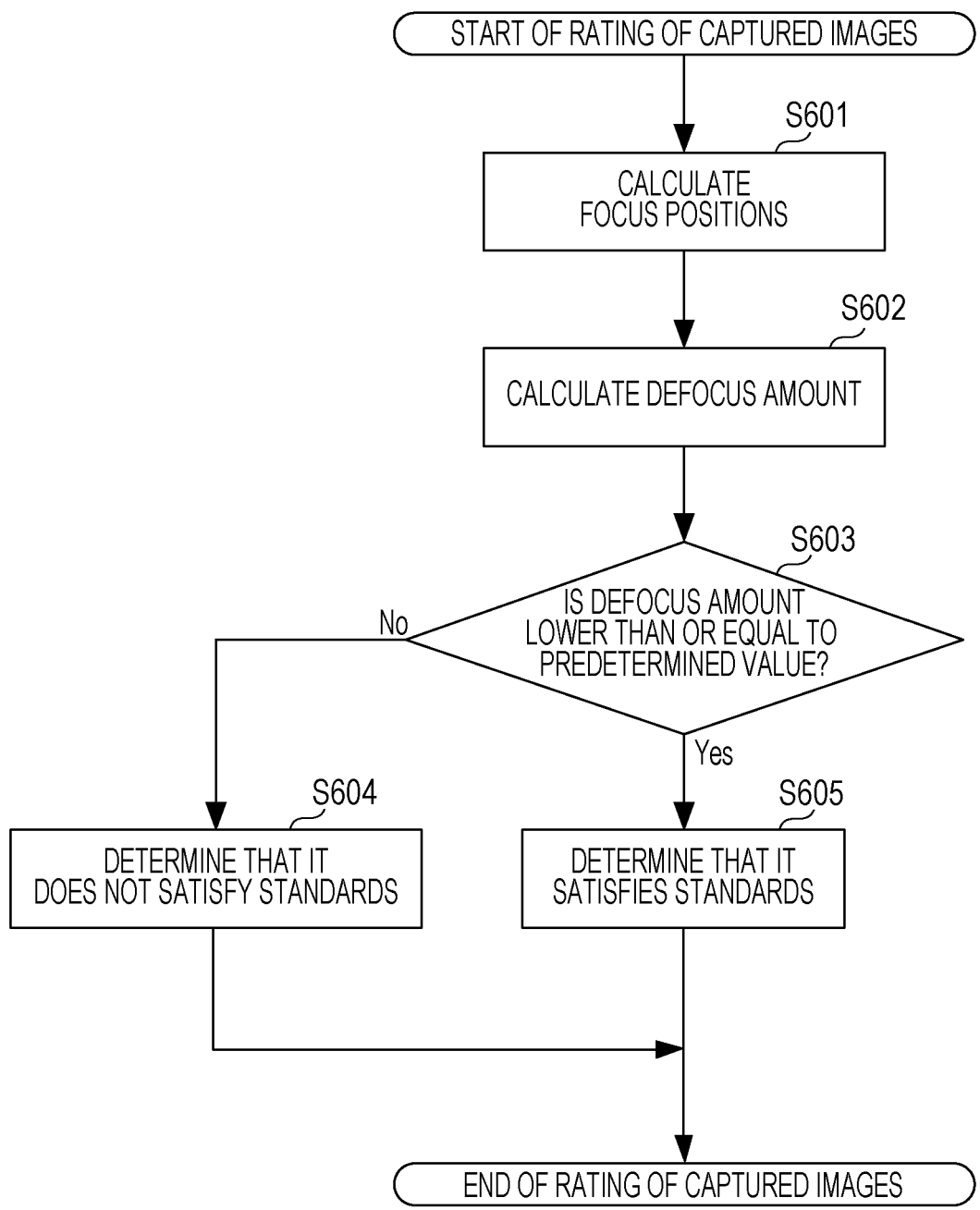
FIG. 6 is a flowchart illustrating captured image rating processing according to the first embodiment.

FIG. 6 is a flowchart illustrating captured image rating processing according to this embodiment. When the captured image rating processing starts, the control circuit 201 in step S601 calculates a focus position where the capturing operation is performed in the last step S503. According to this embodiment, a focus position where the capturing is performed is calculated from a phase difference between the image A and the image B at each pixel of the image capture device in a still image capturing mode.

In step S602, the control circuit 201 calculates a displacement amount of the focus position. The displacement amount of the focus position is calculated from the focus position for capturing acquired in step S601 and the focus positions set in step S501. For example, in a case where the focus position acquired in step S601 is a focus position on the Nth captured image, the focus position may be compared with the Nth focus position of the focus positions set in step S501 to calculate the displacement amount of the focus position.

In step S603, the control circuit 201 determines whether the displacement amount of the focus position is lower than or equal to a predetermined value or not.

If it is determined in step S603 that the displacement amount of the focus position is higher than the predetermined amount, the control circuit 201 moves the processing to step S604 where it is determined that the standards are not satisfied and exits the processing.

If it is determined in step S603 that the displacement amount of the focus position is lower than or equal to the predetermined value, the control circuit 201 moves the processing to step S605 where it is determined that the standards are satisfied and exits the processing. Based on the determination result of step S604 or S605, the determination in step S505 in FIG. 5 is performed.

The processing for rating captured images performed in step S504 has been described up to this point.

Figure 7:
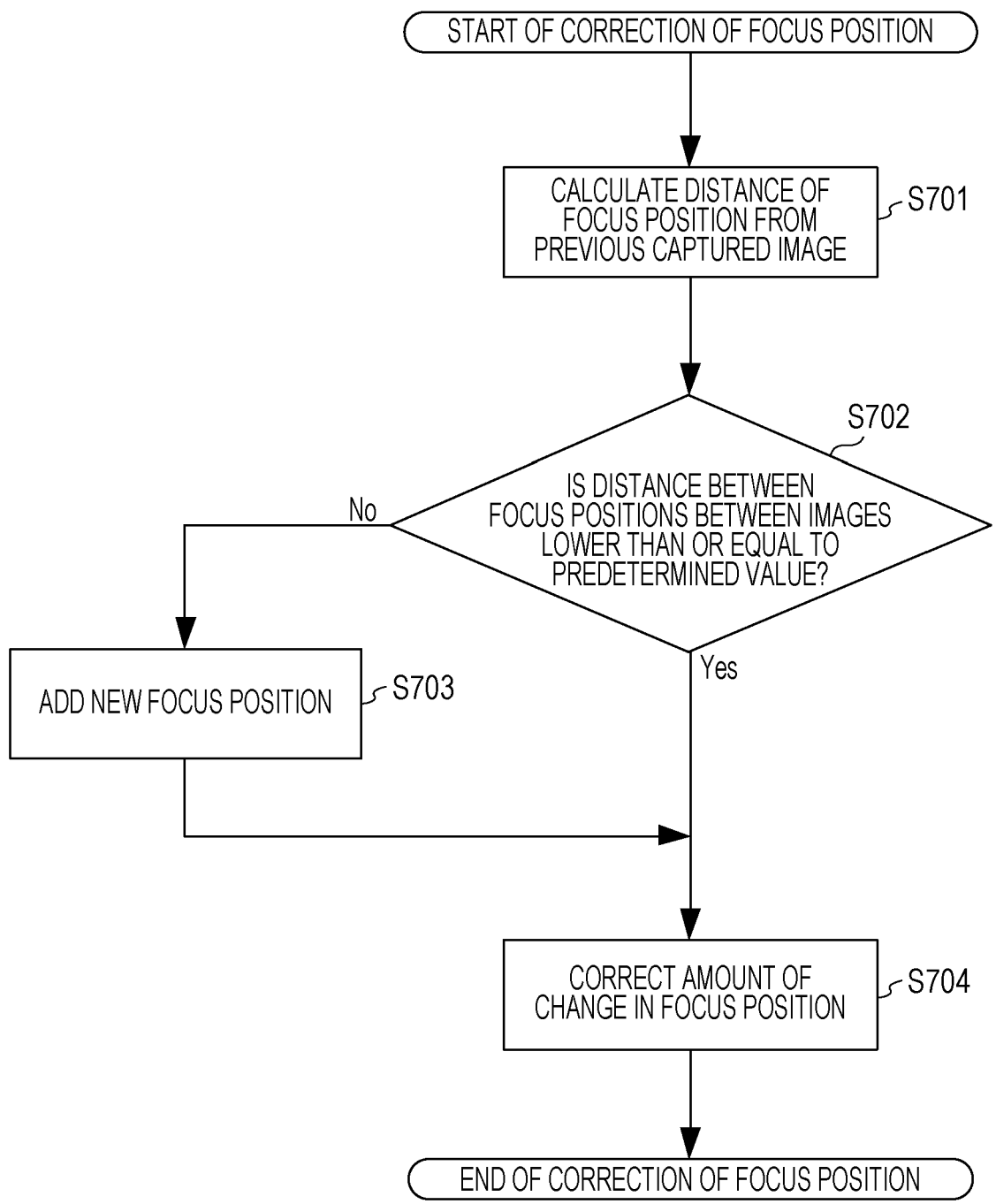
FIG. 7 is a flowchart illustrating correction of a focus position according to the first embodiment.

Next, processing for correcting a focus position performed in step S507 will be described. FIG. 7 is a flowchart illustrating correction of a focus position according to this embodiment will be described.

In step S701, the control circuit 201 calculates a distance between the focus position for the previous capturing operation and the focus position for the current capturing operation. In step S702, the control circuit 201 determines whether the distance between focus positions on the images calculated in step S701 is higher than a predetermined value or not. The predetermined value is determined based on a focal length and an acceptable circle-of-confusion diameter of the image capture device. If a distance higher than the predetermined value may cause a region that is out of focus in both of the two images.

If the control circuit 201 determines that the distance between the focus positions in step S702 is higher than the predetermined value, the control circuit 201 moves the processing to step S703 where a new focus position is added to between the previous image capturing position and the current image capturing position. At the same time, the control circuit 201 adds one to the planned number of images in step S506. Then, the control circuit 201 moves to step S704. In a case where the control circuit 201 adds a new focus position in step S704, image capturing may be performed with the added focus position in the immediately following step S503. Though the image capturing with the added focus position may be performed after capturing with another focus position is completed, camera shake may occur therebetween. As a result, based on the camera shake, the added focus position is to be corrected again.

On the other hand, if the control circuit 201 determines that the distance between the focus positions in step S702 is lower than or equal to the predetermined value, a new focus position is not added, and the processing moves to step S704.

In step S704, the focus position set in step S501 or the focus position updated when the processing is performed in the previous step S704 is updated with the new focus position. In other words, a reference focus position is updated for calculating a displacement amount of the focus position in step S602 in FIG. 6. More specifically, in a case where focus positions are set for capturing in order from the minimum-object-distance side, the focus positions, the number of which is equal to the remaining number of images to be captured, displaced by the amount of change in focus position set in step S501 are set about the most infinite end side focus position as a reference among the focus positions where images have already been captured. In other words, the most infinite end side focus position among the focus position where images have already been captured is displaced more toward the minimum-object-distance side than the focus position set in step S501 first, a plurality of focus positions set for the remaining capturing operations are reset to positions each displaced by the equal amount thereto toward the minimum-object-distance side. In a case where the most infinite end side focus position among focus positions where images have already been captured is displaced toward the infinite end side more than the focus position set in step S501 first, a plurality of focus positions set for the remaining capturing operations are replaced by the equal amount thereto toward the infinite end side. Thus, even when the focus position is displaced in middle of the capturing processing, a difference in focus positions between images to be captured subsequently can be kept constant.

The control circuit 201 corrects the focus position in step S704 in this manner and exits the flowchart in FIG. 7.

FIGS. 8A to 8F illustrate the correction of a focus position according to this embodiment. FIG. 8A illustrates a focus position set in step S501 in FIG. 5.

FIG. 8B illustrates a state which camera shake occurs in a forward side in an optical axis direction when the third image is captured. At a focus position 801, a focus position 802, and a focus position 803, the first, the second and the third images are captured. The focus position 803 where the third image is actually captured is displaced by the amount indicated by an arrow 821 from the focus position where the third image is originally captured. This state is determined as NO in step S603 in FIG. 6 and is determined as YES in step S702 in FIG. 7. Here, the focus position for the third image is merely closer to the focus position for the second image though the focus position is displaced. Therefore, no focus position is added.

FIG. 8C illustrates a focus position 804 where the fourth image is to be captured. The new focus position 804 is set at the position displaced from the focus position 803 for the third image by the amount of change set in step S501 in FIG. 5.

FIG. 8D illustrates a state in which camera shake occurs on art infinite end side in an optical axis direction when the fifth image is captured. A focus position 805 where the fifth image is actually captured is displaced from the focus position where the fifth image is planned to be captured by the amount indicated by an arrow 822. Referring to FIG. 8D, the distance between the focus position 804 where the fourth image is captured and the focus position 805 where the fifth image is captured is higher than a predetermined value. Therefore, between the focus positions, there is a region not included in the depth of field in both of the fourth and fifth images. This state is determined as NO in step S603 in FIG. 6 and is determined as NO in step S702 in FIG. 7.

Accordingly, as illustrated in FIG. 8E, a new focus position 811 is set between the focus position 804 and the focus position 805, and image capturing is performed with the focus position 811. The processing for setting the focus position 811 corresponds to step S703 in FIG. 7. In a case where the interval between the focus position 804 and the focus position 805 is large and adding one new focus position is not sufficient, two or more focus positions may be added. With at least one newly added focus position, the distance between adjacent focus positions in images can be lower than or equal to a predetermined value.

FIG. 8F illustrates a state a focus position 806 is set at a position displaced from the focus position 805 by the amount of change set in step S501 in FIG. 5 for image capturing.

According to the first embodiment, in a case where a plurality of images captured at different focus positions are combined, displacement amounts between each of the focus positions where the image is actually captured and a planned focus position is calculated. Thus, the focus position for the next capturing operation can be adjusted to reduce blurring in the resulting combined image.

In a case where larger camera shake occurs in a forward side, the capturing may possibly complete before the planned focus position even though the planned number of images are captured. Accordingly, even when capturing the planned number of images completes in step S506 in FIG. 5, and if the interval between the focus position on the most minimum-object-distance side and the focus position on the most infinite end side is smaller than an originally set range, the control circuit 201 may add another focus position for capturing. For example, in a case where the focus position where an image is actually captured last time is closer to the focus position for capturing an image first than the focus position of the last image derived from the value set in step S501, it can be determined that the focus position distribution range is narrow. On the other hand, when the amount of camera shake is large on the infinite end side and when capturing with the originally planned focus position completes before the planned number of images are captured as a result of the addition of a focus position in the middle, the capturing operation may be finished then.

Second Embodiment

According to a second embodiment, an image capture apparatus having a focus detection sensor separately from an image sensor is applied. Details thereof will be described with reference to drawings. Any repetitive descriptions regarding the first and second embodiments will be omitted.

Figure 9:
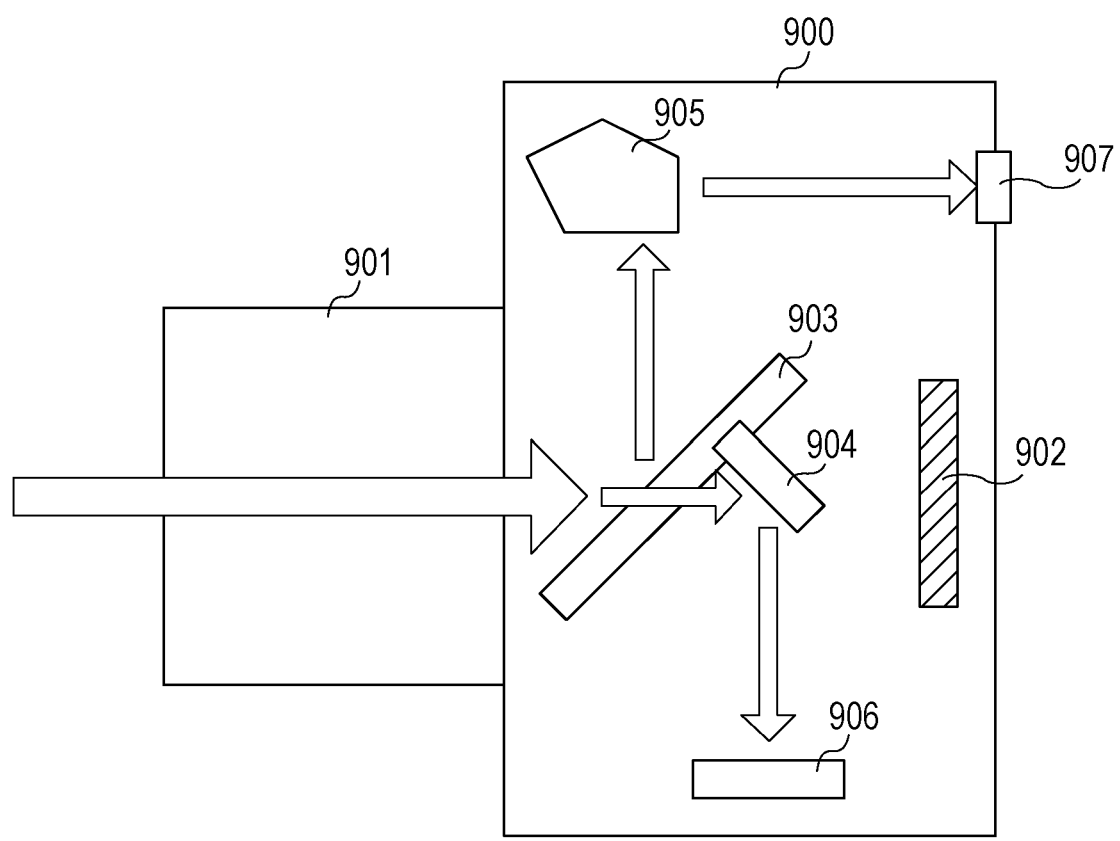
FIG. 9 illustrates a structure of a digital single-lens reflex camera according to a second embodiment.

FIG. 9 illustrates a structure of a digital single-lens reflex camera. Though the second embodiment will be described below based on a digital single-lens reflex camera, embodiments of the present invention are not limited thereto. Any image capture apparatus having an image sensor and a focus detection sensor separately may be applied. A lens barrel 901 is mounted in a digital single-lens reflex camera 900. In order to capture an image, a mirror 903 and a sub-mirror 904 are withdrawn from an imaging optical path, and light having passed through the lens barrel 901 is mounted to an imaging sensor 902. Before and after an image is captured, a part of light reflected by the mirror 903 arranged on the imaging optical path is bent by the prism 905 and is then guided to a viewfinder 907, as illustrated in FIG. 9. A part of the light reaching the mirror 903 passes through the mirror 903, is reflected by the sub-mirror 904 connected to the mirror 903 and is guided to an AF sensor 906. The AF sensor 906 can calculate a displacement amount of a focus position and a direction of displacement.

Figure 10:
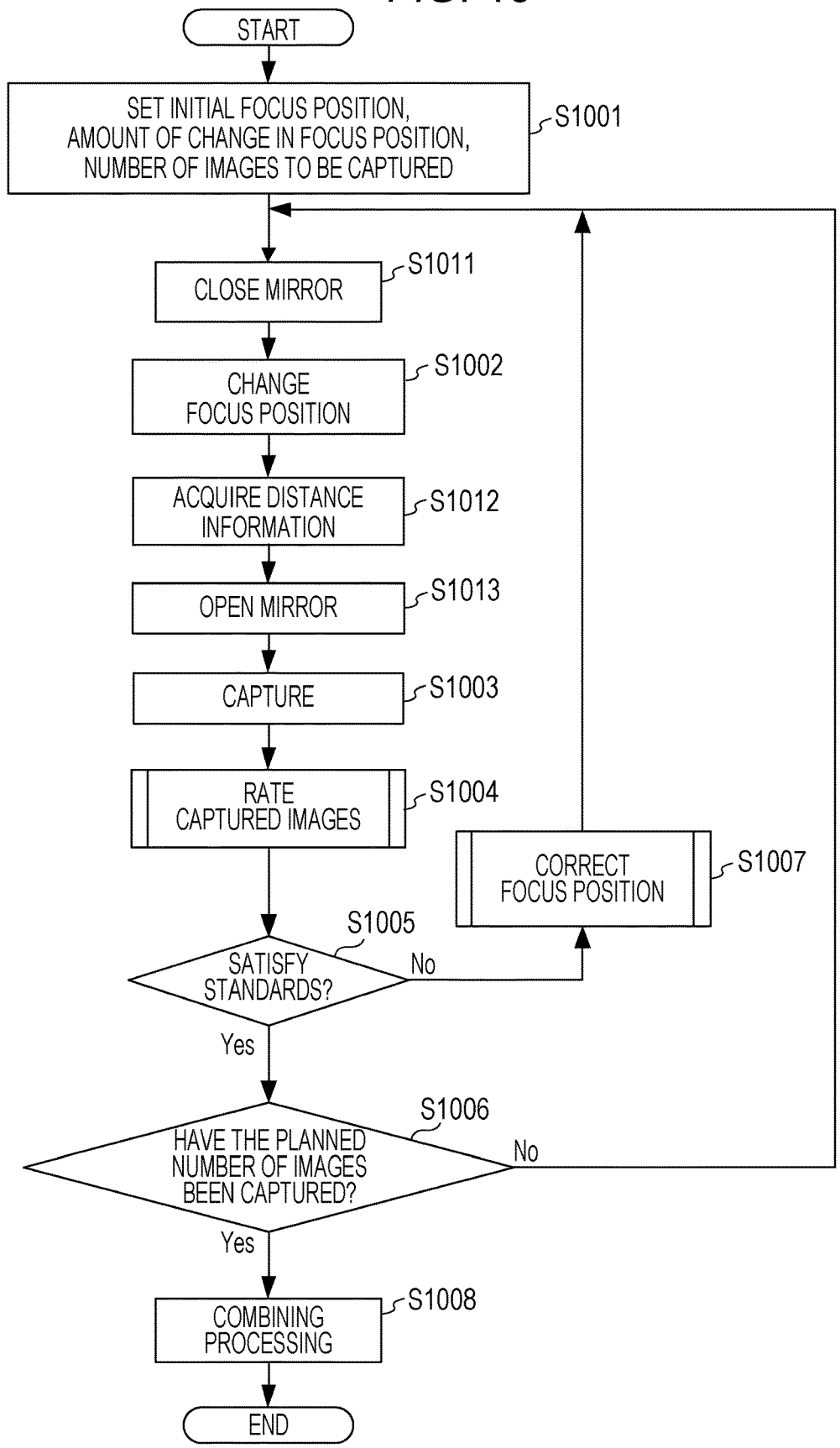
FIG. 10 is a flowchart illustrating focus stacking according to the second embodiment.

FIG. 10 is a flowchart illustrating focus stacking processing according to this embodiment. The processing in steps S1001 to S1008 is the same as the processing in steps S501 to S508 in FIG. 5 according to the first embodiment.

The control circuit 201 in step S1001 sets an initial focus position, an amount of change in focus position and the number of capturing operations and in step S1011 inserts toe mirror 903 to the imaging optical path. The control circuit 201 in step S1013 before the capturing in step S1003 causes the mirror 903 to be withdrawn from the imaging optical path.

In step S1012, the AF sensor 906 acquires ranging information, and the acquired distance information is used for the rating of captured images in step S1004 to be performed by the control circuit 201. There is actually a difference between the time when ranging information is acquired in step S1012 and the time when image capturing is performed in step S1003, but the difference is not significant and does not cause any problem. Thus, the ranging information acquired in step S1012 may be used to perform the rating of captured images can be performed in step S1004.

According to the second embodiment, even in an image capture apparatus having an image sensor and a focus detection sensor separately, a plurality of images captured at different focus positions may be combined, resulting in generation of a combined image having reduced blurring.

Third Embodiment

According to a third embodiment an image capture apparatus is applied which estimates a focus position for capturing based on a result of analysis on contrast values to generate captured images, instead of direct calculation of a displacement amount of a focus position and the direction of displacement. The third embodiment will be described in detail with reference to drawings. Any repetitive descriptions regarding the first and third embodiments will be omitted.

Figure 11:
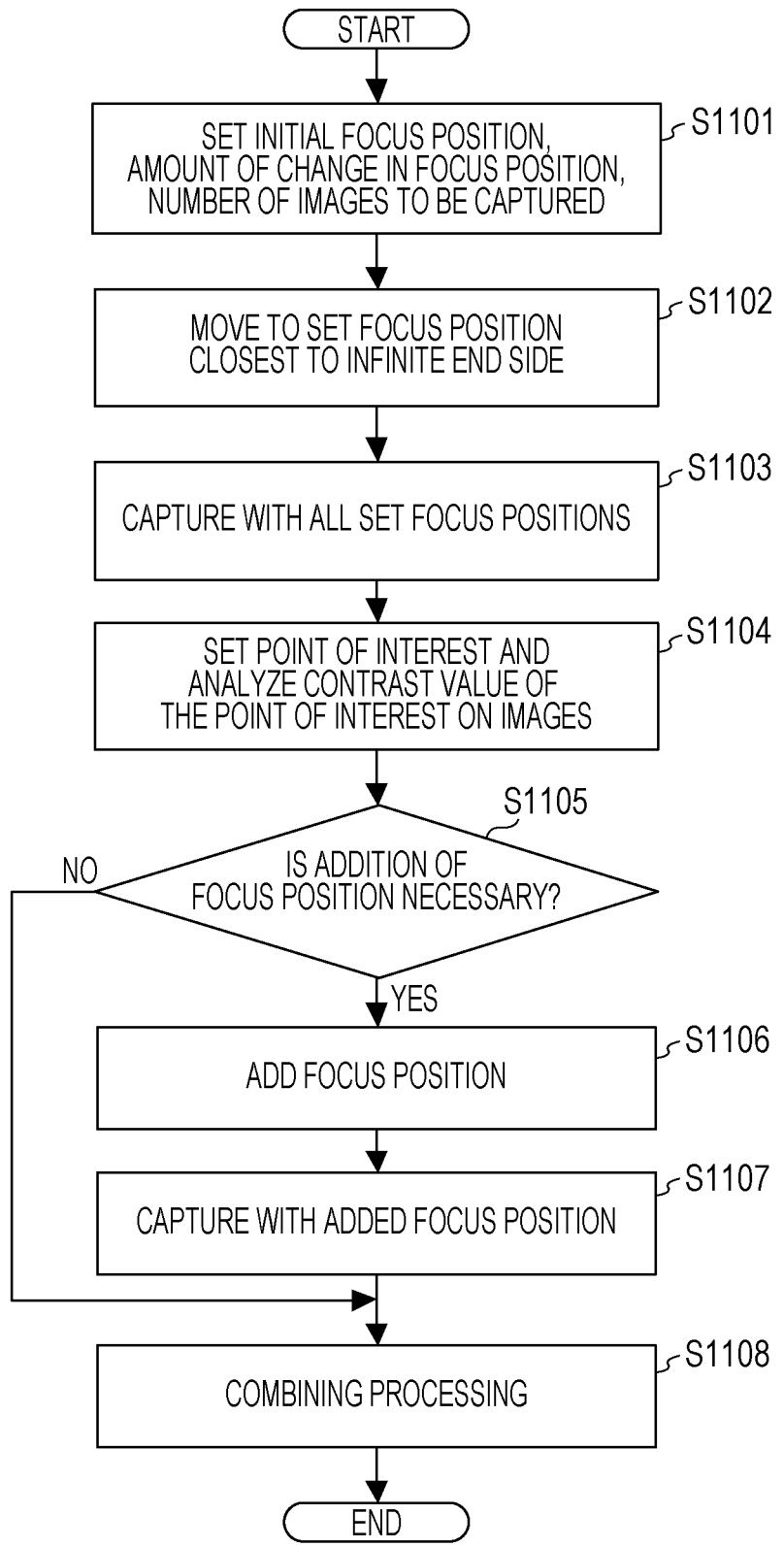
FIG. 11 is a flowchart illustrating focus stacking according to a third embodiment.

FIG. 11 is a flowchart illustrating focus stacking processing according to this embodiment.

In step S1101, the control circuit 201 sets an initial focus position and an amount of change in focus positions and the number of images to be captured based on user's settings. In step S1102, the control circuit 201 moves the focus position of the image capture apparatus to the most infinite end side focus position of the focus positions set in step S1101. Next, in step S1103, the image capture apparatus performs a capturing operation at the set focus positions.

Figure 12A:
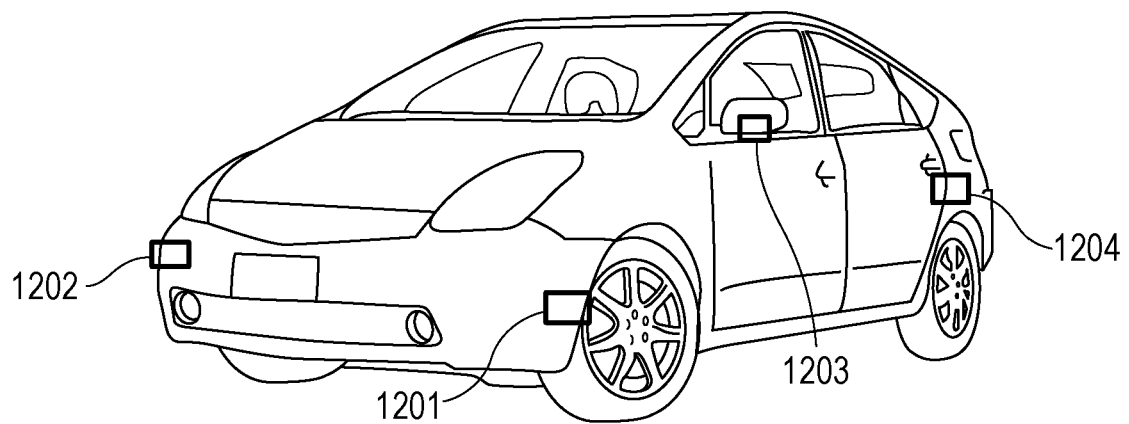
FIG. 12A illustrates an image to be used for contrast analysis according to the third embodiment.
Figure 12B:
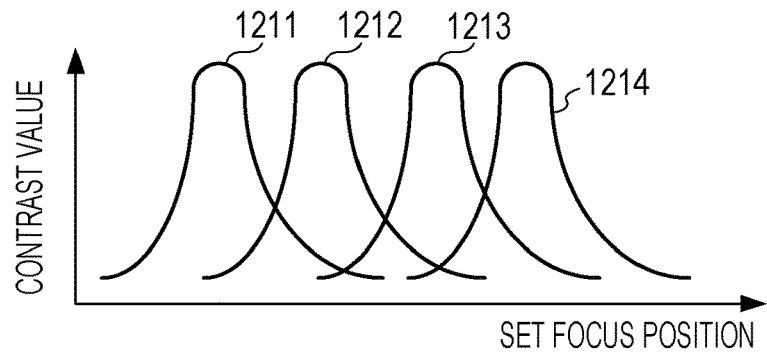
FIG. 12B is a graph illustrating a result of analysis on a contrast at a point of the interest according to the third embodiment.

In step S1104, the image processing circuit 207 sets a point of interest and analyzes a contrast value of the point of interest on the images. The image processing circuit 207 may extract an edge from an image and may set many points of interest at the edge. FIGS. 12A to 12E illustrate a contrast value at a point of interest according to this embodiment. FIG. 12A illustrates an object, and regions 1201 to 1204 (hereinafter, each called a point of interest) are designated arbitrarily by the image processing circuit 207. On each of the images captured at the set focus positions, a contrast value of each of the points of interest is calculated and is plotted. Thus, a relationship between contrast value and set focus position can be acquired. FIG. 12B illustrates curved lines 1211 to 1214 representing relationships between contrast value and set focus position at points of interest 1201 to 1204 in FIG. 12A. Referring to FIG. 12B, when the point of interest is focused, the contrast value increases. As the displacement of the focus position increases, the contrast value decreases. The relationship between contrast value and set focus position in FIG. 12B can be acquired if camera shake does not occur.

Figure 12C:
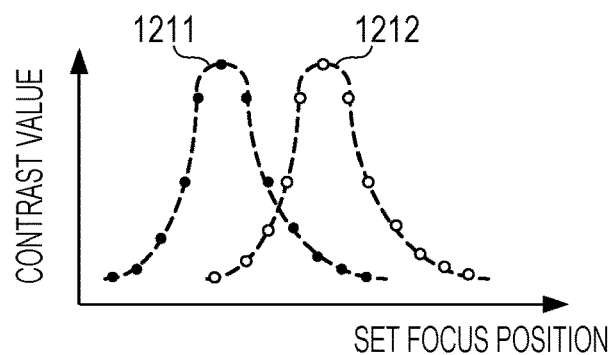
FIG. 12C illustrates a result of analysis on a contrast without camera shake according to the third embodiment.

Next, the analysis on the contrast value at a point of interest in step S1104 will be described with reference to examples. For simplicity, analysis on points of interest 1201 and 1202 will only be described, for example. FIG. 12C illustrates contrast values at focus positions of the points of interest 1201 and 1202 in actual capturing operations. Referring to FIG. 12C, because the image capture apparatus captures with discrete focus positions, discrete contrast values are generated. However, curved lines 1211 and 1212 in FIG. 12B are approximate curved lines of the contrast values. Therefore, in a case where the image processing circuit 207 can calculate the contrast values as illustrated in FIG. 12C, the control circuit 201 determines that camera shake does not occur during a capturing operation and that addition of a focus position in step S1105 is not necessary.

Figure 12D:
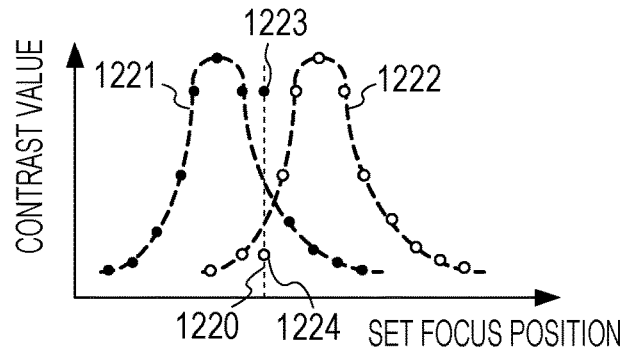
FIG. 12D illustrates a result of an analysis of a contrast with camera shake in a forward side according to the third embodiment.

FIG. 12D illustrates contrast values when camera shake occurs toward a forward side. Referring to FIG. 12D, though the contrast value changes smoothly with a relative maximum, the contrast value at the focus position 1220 is deviated largely from other values. Curved lines 1221 and 1222 indicate approximate curved lines of contrast values excluding the one at the focus position 1220. A contrast value 1223 at the point of interest 1201 is higher than the value at the focus position 1220 on the curved line 1221, and the contrast value 1224 at the point of interest 1202 is lower than the value at the focus position 1220 on the curved line 1222. In other words, the contrast value at the point of interest on the image captured with the focus position 1220 is close to the value of a focus position on the closer side on the curved lines 1221 and 1222. Thus, the control circuit 201 can determine that camera shake occurs on a closer side.

Figure 12E:
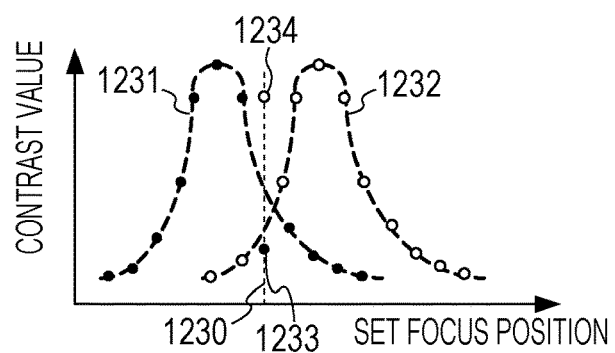
FIG. 12E illustrates a result of analysis on a contrast with camera shake on an infinite end side according to the third embodiment.

FIG. 12E illustrates contrast values when camera shake occur on an infinite end side. Referring to FIG. 12E, only the contrast value at the focus position 1230 is larger than other values, like the case in FIG. 12D. Curved lines 1231 and 1232 indicate approximate curved lines of the contrast values excluding the one at the focus position 1220. More specific, the contrast value 1233 at the point of interest 1201 is lower than the value at the focus position 1230 of the curved line 1231. The contrast value 1234 at the point of interest 1202 is higher than the value at the focus position 1230 of the curved line 1232. In other words, the contrast value at a point of interest where an image is captured with the focus position 1230 is closer to the value at the focus position on the more infinite end side on the curved lines 1231 and 1232. Thus, the control circuit 201 can determine that camera shake occurs on an infinite end side.

The image processing circuit 207 may set as many points of interest as possible in step S1101 for higher accuracy of determination of the direction of camera shake. For determination of addition of a focus position in step S1105, the image processing circuit 207 does not use the point of interest having a contrast value from which an approximate curved line cannot be calculated.

When camera shake occurs, image usable for generation of a combined image cannot be captured at the focus position 1220 or 1230. Therefore, the control circuit 201 determines in step S1105 that addition of a focus position is necessary. Next, in step S1106, a focus position is added, and the image capture apparatus in step S1107 captures an image with the added focus position. The added focus position may be the focus position 1220 or 1230 but may be any arbitrary position close to the focus position 1220 or 1230 if an out-of-focus period does not occur.

On the other hand, if the control circuit 201 in step S1105 determines that addition of a focus position is not necessary, the processing directly moves to step S1108. In step S1108, the image processing circuit 207 performs combining processing.

According to the third embodiment, in order to combine a plurality of images captured at different focus positions, the amount and direction of displacement due to camera shake may not be directly calculated, but the focus position for the next capturing operation may be adjusted to generate a combined image with reduced blurring.

Fourth Embodiment

According to a fourth embodiment, image configuration is attempted by using a refocusable image capture device, unlike the first to third embodiments.

An image capture apparatus according to the fourth embodiment may be the same as the one illustrated in FIGS. 1 and 2. However, the image sensor 204 has a structure different from those of the first to third embodiments.

Figure 13:
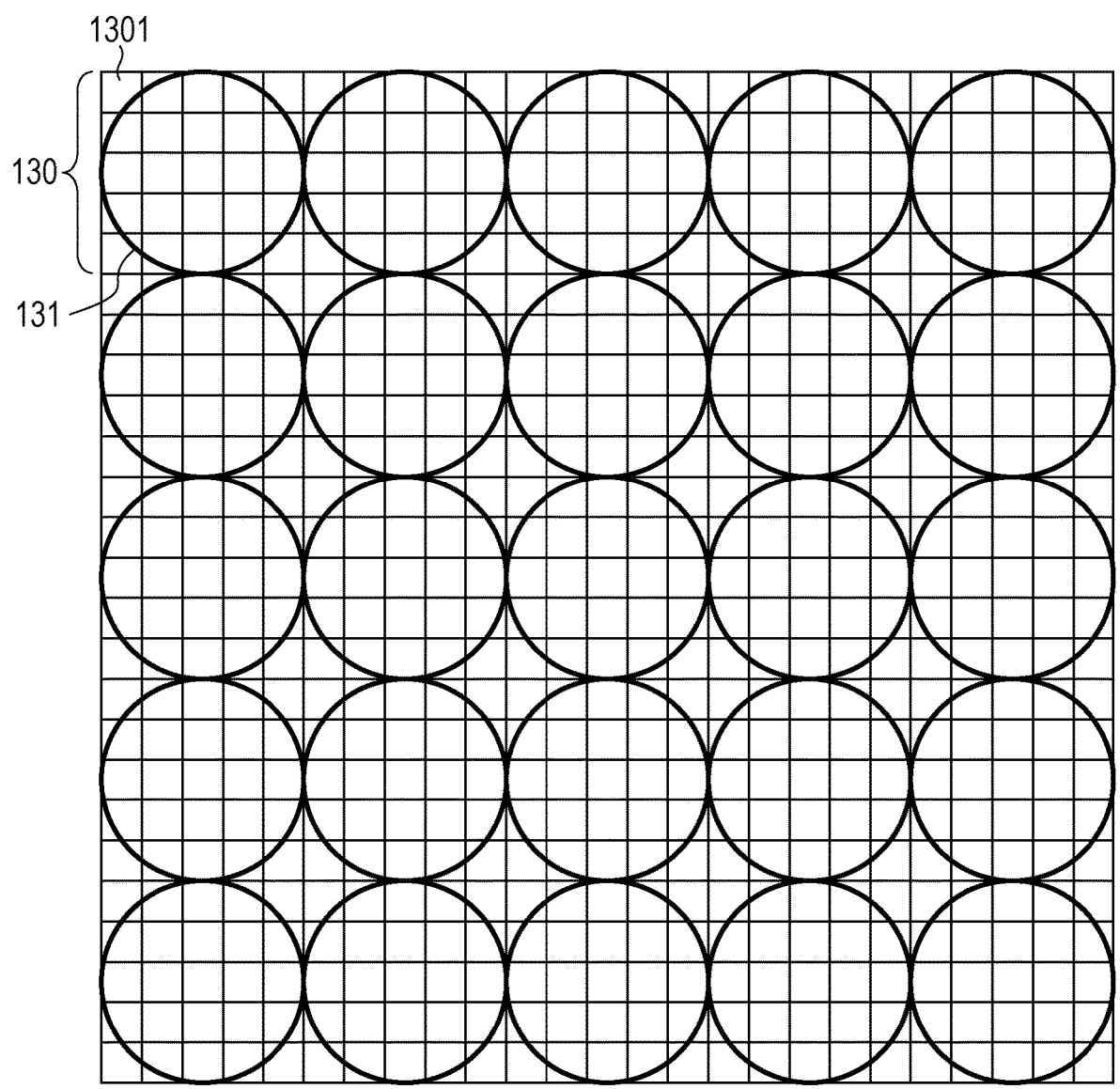
FIG. 13 illustrates an array of sensors included in an image sensor according to a fourth embodiment.

FIG. 13 illustrates an array of sensors included in the image sensor 204 according to this embodiment. One microlens 131 is provided correspondingly to a plurality of photoelectric conversion units 1301. A plurality of photoelectric conversion units 1301 behind one microlens is collectively called a pixel array 130. Referring to FIG. 13, the pixel array 130 has five rows and five columns, that is, a total of 25 photoelectric conversion units 1301. However, embodiments of the present invention are not limited thereto.

Figure 14:
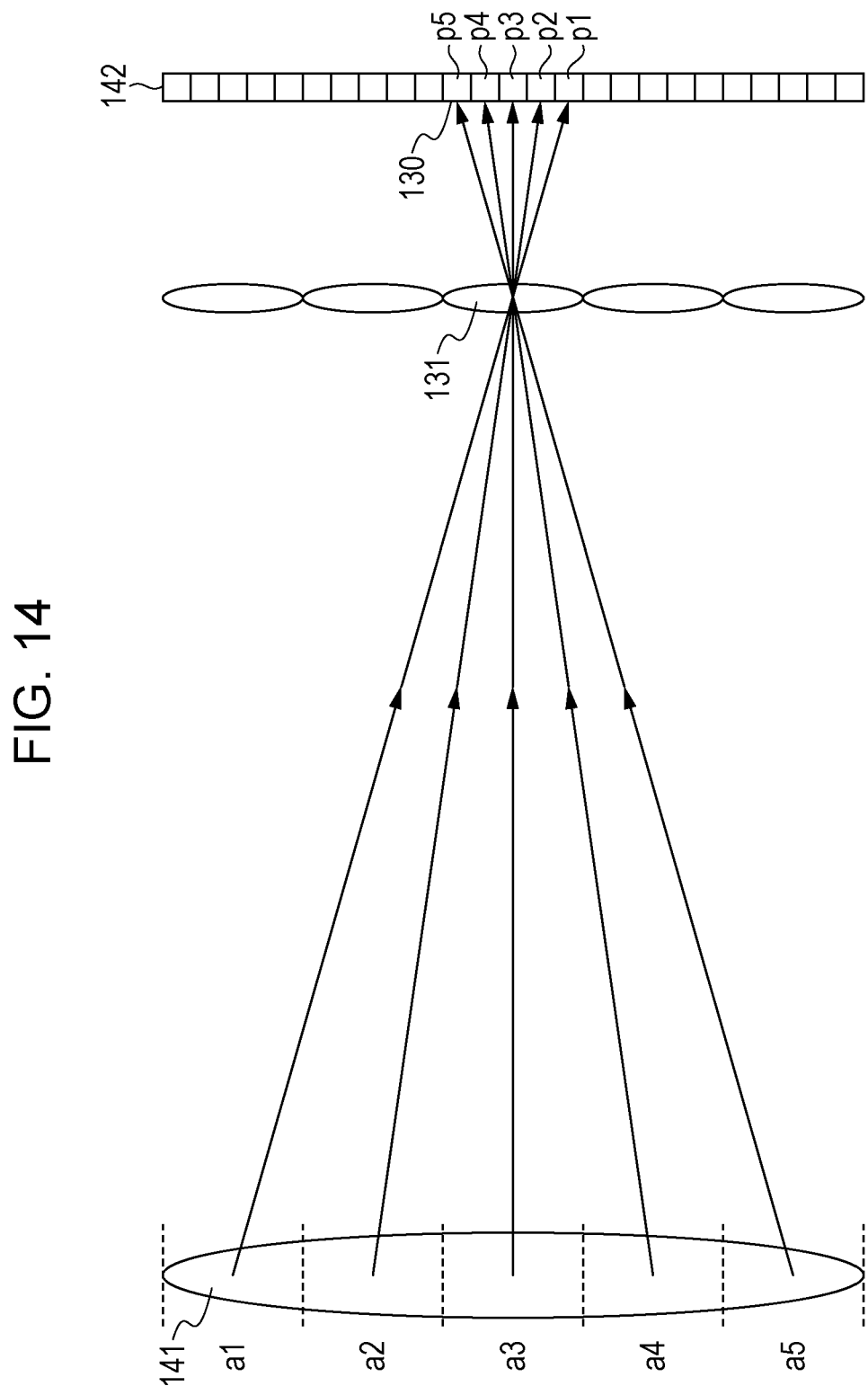
FIG. 14 illustrates input of an optical signal to a pixel according to the fourth embodiment.

FIG. 14 illustrates input of an optical signal to pixels according to this embodiment.

FIG. 14 illustrates a state viewed from a vertical direction about an optical axis in which light emitted from the imaging lens 141 passes through the one microlens 131 and is received by the image capture device 142. Light emitted from pupil regions a1 to a5 of the imaging lens 141 and passing through the microlens 131 is focused at respective photoelectric conversion units p1 to p5 in the backward direction.

By using the image sensor as illustrated in FIG. 13, the control circuit 201 can acquire information regarding an object distance based on optical signals acquired by a plurality of photoelectric conversion units corresponding to one microlens.

Here, a method will be described which calculates a focus position (refocus plane) corresponding to an object within a certain range.

Figure 15A:
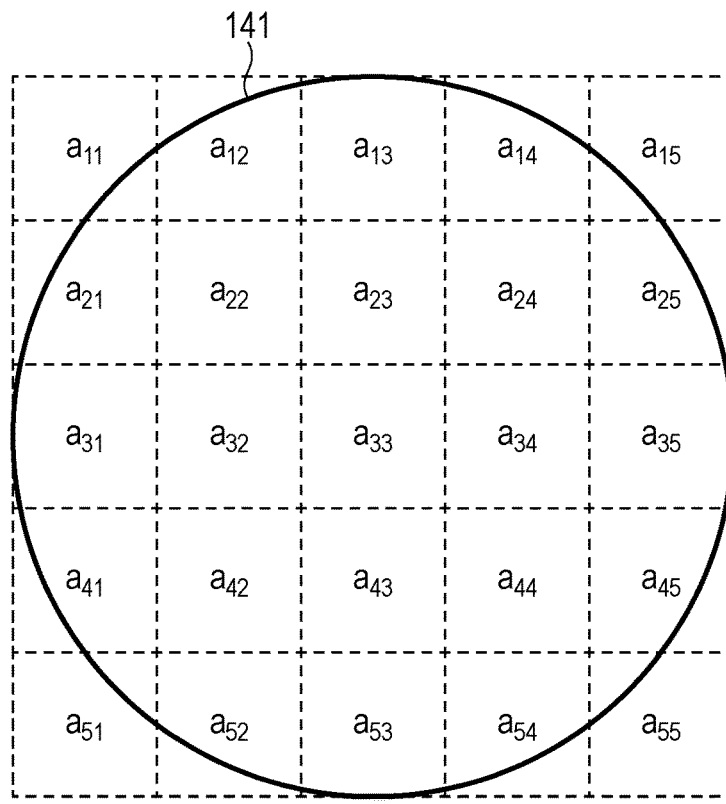
FIG. 15A is a view in an optical axis direction of an aperture of an imaging lens according to the fourth embodiment.
Figure 15B:
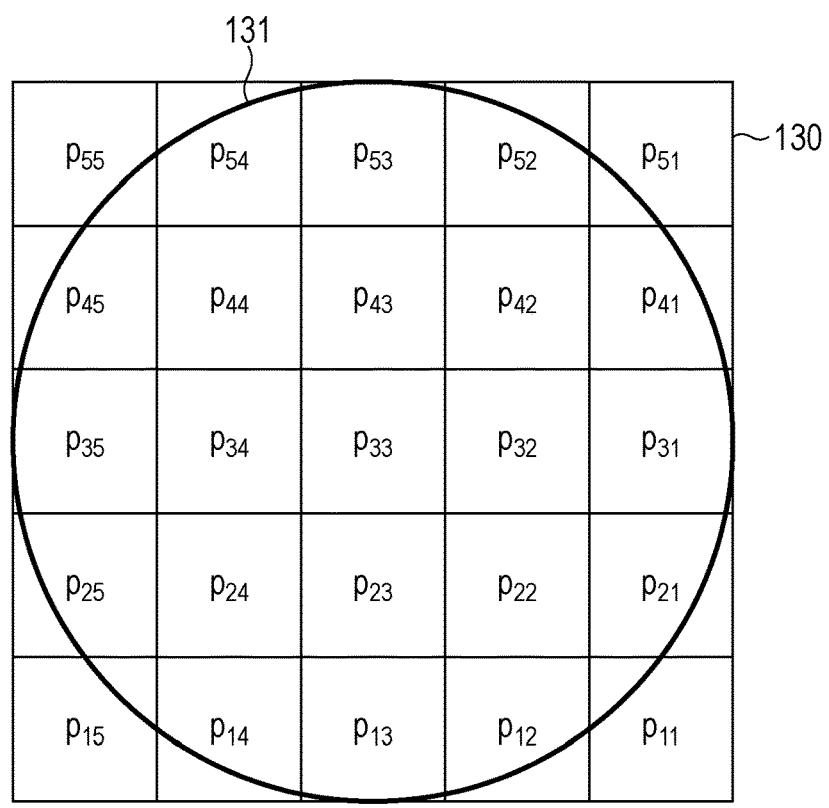
FIG. 15B is a view in the optical axis direction of one microlens and a pixel array placed behind the microlens according to the fourth embodiment.

FIG. 15A is a view from an optical axis direction of an aperture of the imaging lens 141. FIG. 15B is a view from an optical axis direction of the one microlens 131 and the pixel array 130 arranged in the backward direction. In a case where, as illustrated in FIG. 15A, a pupil region of the imaging lens 141 is divided into regions the number of which is equal to the number of photoelectric conversion units in the backward direction of one microlens, light emitted from one pupil divided region of the imaging lens 141 is focused at one photoelectric conversion unit. It is assumed here that reference numbers given in the imaging lens 141 and the microlens 131 are substantially matched.

The correspondences between the pupil divided regions a11 to a55 in the imaging lens 141 illustrated in FIG. 15A and pixels p11 to p55 illustrated in FIG. 15B are point symmetrical about an optical axis Z direction. Thus, the light emitted from the pupil divided region a11 of the imaging lens 141 is focused at the pixel of the pixel array 130 in the backward direction of the microlens. Also, light emitted from the pupil divided region a11 and passing through another microlens 131 is focused at the pixel p11 of the pixel array 130 in the backward direction of the microlens.

The photoelectric conversion units in the pixel array 130 receive light passing through pupil regions different from each other of the imaging lens 141. A plurality of pixel signals from the divided signals is combined to generate a pair of signals pupil divided in the horizontal direction.

$$\sum_{a=1}^{5} \sum_{b=1}^{2} (p_{ab}) \qquad (1)$$

$$\sum_{a=1}^{5} \sum_{b=4}^{5} (p_{ab}) \qquad (2)$$

Expression (1) integrates light beams passing through left side regions (pupil regions a11 to a52) of the exit pupils of the imaging lens 141 for each of the photoelectric conversion units of the pixel array 130. This is applied to a plurality of pixel arrays 130 in the horizontal direction, so that an object image, which is called an image A, can be constructed by output signals therefrom. Expression (2) integrates light beams passing through right side regions (pupil regions a14 to a55) of exit pupils of the imaging lens 141 for each of the photoelectric conversion units in one pixel array 130. This is applied to a plurality of pixel arrays 130 arranged in the horizontal direction so that an object image, which is called an image B, can be constructed from output signals therefrom. The control circuit 201 performs correlation calculation on the image A and the image B to detect an image displacement amount (pupil division phase difference). The image displacement amount may be multiplied by a transform coefficient depending on the focal position of the imaging lens 141 and an optical system so that the focus position corresponding to an object within a frame can be calculated.

Next, image reconstruction processing will be described on a refocus plane being a set focus position for the captured data acquired by the image sensor 204.

Figure 16:
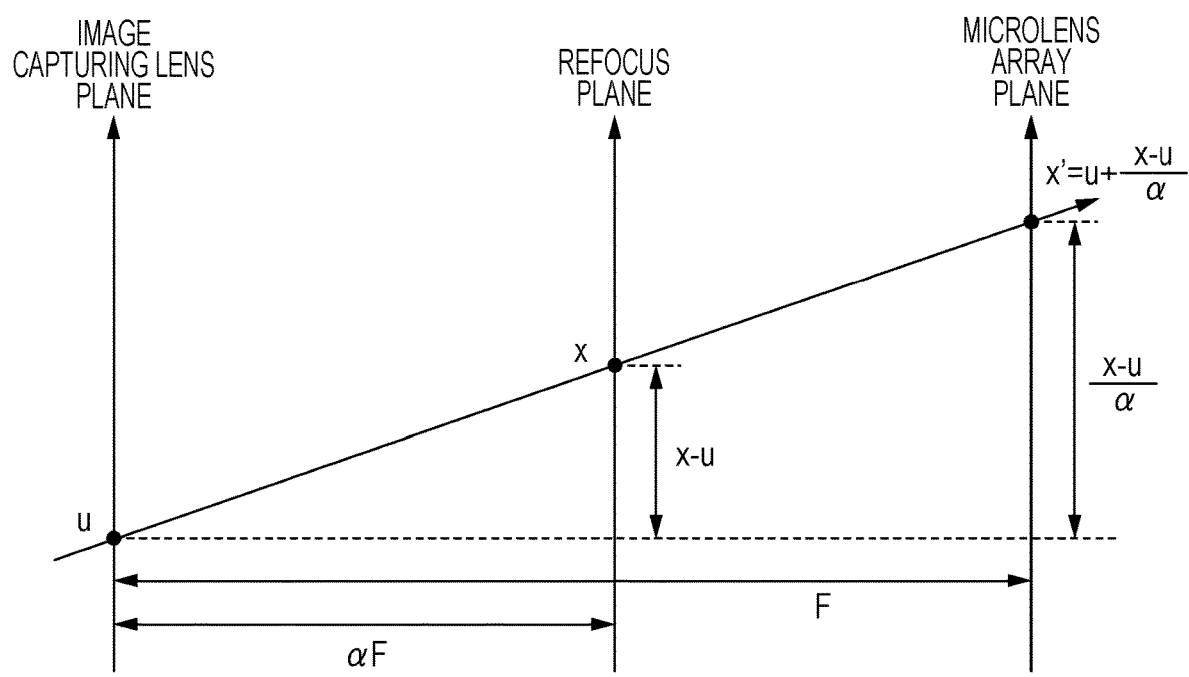
FIG. 16 illustrates calculation refocus plane according to the fourth embodiment.

FIG. 16 illustrates calculation of a refocus plane according to this embodiment. Referring to FIG. 16, from which pupil divided region a light beam passing through a pixel on a set refocus plane is emitted and to which microlens the light beams enters are viewed from the vertical direction about the optical axis Z. FIG. 16 illustrates coordinates (u, v) indicating a position of a pupil divided region of the imaging lens 141, coordinates (x, y) indicating a pixel position on the refocus plane, and coordinates (x', y') indicating a position of a microlens on the microlens array. FIG. 16 further illustrates F indicating a distance from the imaging lens to the microlens array and αF indicating a distance from the imaging lens to the refocus plane. Referring to FIG. 16, α is a refocus coefficient for determining a position of the refocus plane and can be set by a user. FIG. 16 only illustrates directions u, x, and x' and does not illustrates directions v, y, and y'. As illustrated in FIG. 16, the light beams passing through the coordinates (u, v) and the coordinates (x, y) reach the coordinates (x', y') on the microlens array. The coordinates (x', y') can be expressed by the following Expression (3).

$$(x', y') = \left(u + \frac{x-u}{\alpha}, v + \frac{y-v}{\alpha}\right) \qquad (3)$$

When a pixel receiving the light outputs L(x', y', u, v), an output E(x, y) obtained at the coordinates (x, y) on the refocus plane is equal to a result of integration of L(x', y', u, v) with respect to the pupil regions of the imaging lens, which can be expressed by the following Expression (4).

$$E(x, y) = \frac{1}{\alpha^2 F^2} \int \int L\left(u + \frac{x-u}{\alpha}, v + \frac{y-v}{\alpha}, u, v\right) du\, dv \qquad (4)$$

Because the refocus coefficient α in Expression (4) is determined by a user, the position (x', y') of the microlens to which light enters can be acquired if (x, y) and (u, v) are given. Then, from the pixel array 130 corresponding to the microlens, the pixel corresponding to the position (u, v) can be acquired. The pixel outputs L(x', y', u, v). This processing is performed all of the pupil divided regions, and the acquired pixel outputs are integrated to acquire E (x, y) When (u, v) are defined as representative coordinates of a pupil divided region of the imaging lens, the integration in Expression (4) can be calculated by a simple addition.

The refocus method has been described up to this point. However, it is difficult to generate a correct refocused image if the refocus plane is not set at a focus position of a refocus range from a focus position with which an original image is captured. This may be because the angle distribution of a tight beams entering to an image capture device, that is, a parallax amount of parallax images is limited by an aperture system of an imaging lens and a diaphragm and pixel pitches in the image sensor. Next, a method for calculating a refocus range will be described.

Hereinafter, a two-dimensional intensity distribution of light will be called a light field space component. In this case, the refocus range depends on a sampling pitch Δy of a space component and a sampling pitch Δu of an angle component, and its coefficient α± is given by the following Expression (5).

$$\alpha_{\pm} = \frac{1}{1 \pm \Delta y / \Delta u} \qquad (5)$$

Figure 17:
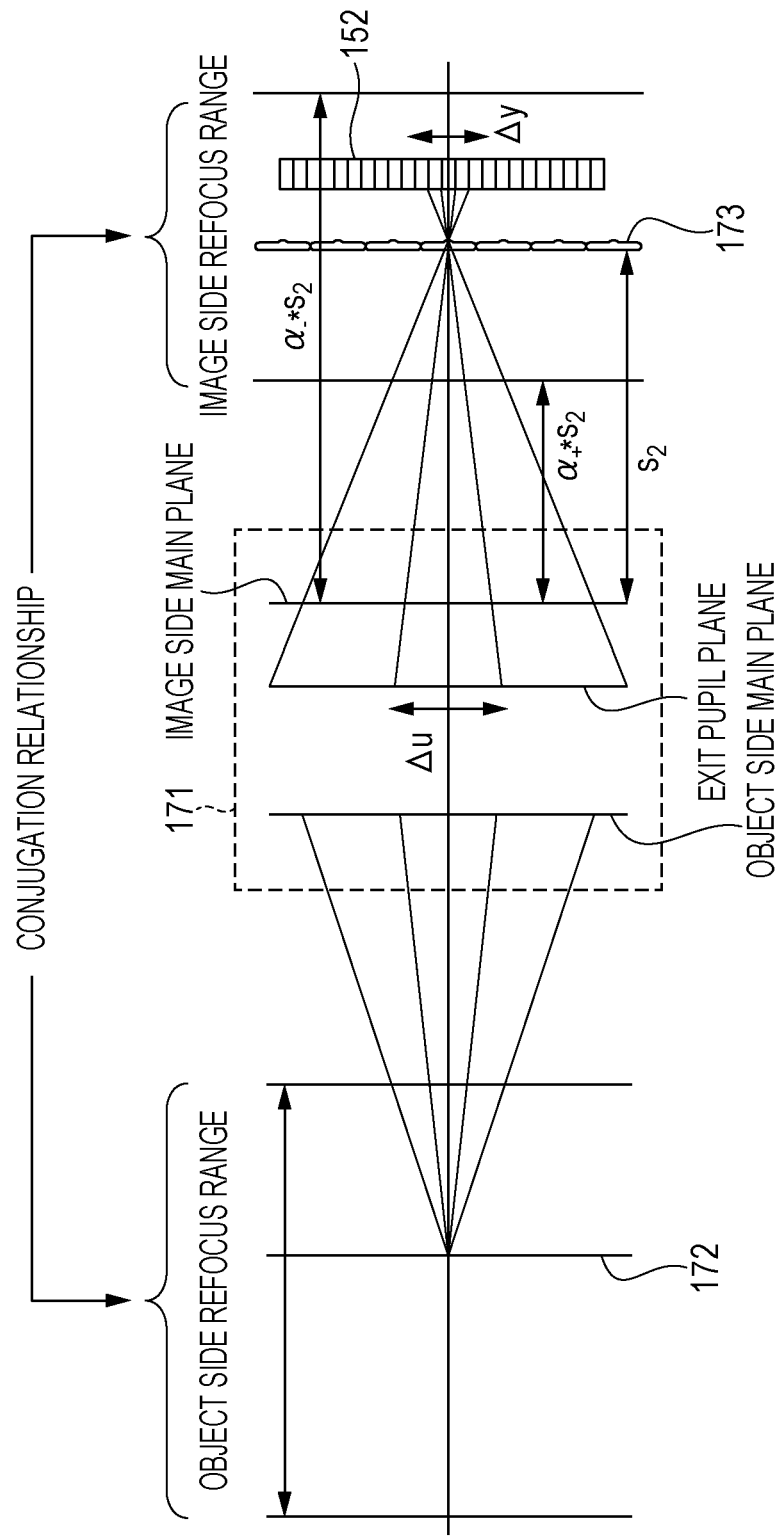
FIG. 17 illustrates a refocus range according to the fourth embodiment.

FIG. 17 illustrates a refocus range according to this embodiment. A refocus range of $(\alpha+)*s\,2$ to $(\alpha-)*s\,2$ on an image expressed by Expression (1) and a conjugate range with respect to an imaging optical system 171 correspond to an object side refocus range. Here, s 2 is a distance between an image main plane of the imaging optical system 171 and an image side conjugate plane of the imaging optical system 171 with respect to an object plane 172.

In the configuration example illustrated in FIG. 17, a one-dimensional pixel period for capturing an identical position on the object plane 172 is equal to three *pixels*. Therefore, the sampling pitch $\Delta y$ of a space component is three times the pixel pitch of the image capture device. The sampling pitch $\Delta u$ of an angle component is ⅓ of the exit pupil diameter because the exit pupil of the imaging optical system 171 is divided into three (or, two-dimensionally, into nine). If the range exceeds the refocus range expressed by Expression (5), the acquired light field lacks information, and, as a result, it is difficult to generate a correct refocused image. Because Expression (5) has a pixel pitch $\Delta$ of the image capture device that is sufficiently low with respect to a pupil distance P of the imaging optical system 171, it can be approximated by the following Expression (6).

$$\alpha \pm s_2 \mp NF\Delta y = s_2 \mp NF\Delta_{LA} \qquad (6)$$

Here, the pupil distance P of the imaging optical system 171 corresponds to a distance between the exit pupil plane of the imaging optical system 171 and an image side conjugate plane of the imaging optical system 171 with respect to the object plane 172. N is a one-dimensional number of divisions of a pupil of the imaging optical system 171, F is an F value of the imaging optical system 171, and $\Delta LA$ is a pitch between the pixel arrays 130.

The method for calculating a refocus range has been described up to this point. Hereinafter, the term "refocus range" refers to an object side refocus range unless otherwise specified.

Figure 18:
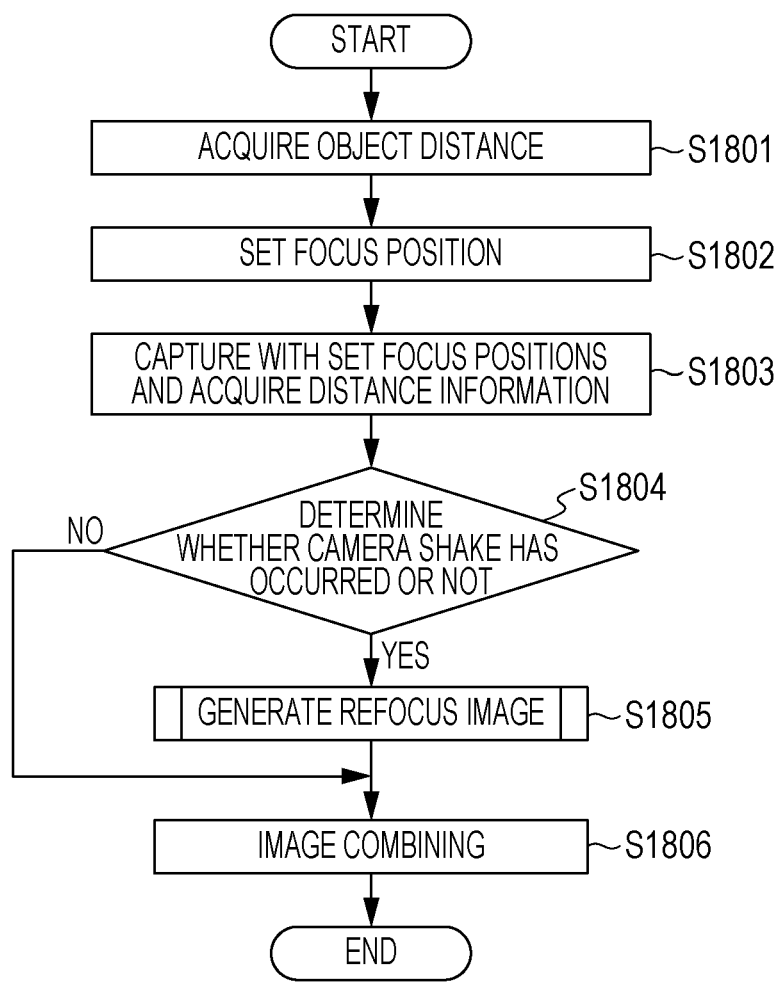
FIG. 18 is a flowchart illustrating the fourth embodiment.

FIG. 18 is a flowchart illustrating this embodiment.

In step S1801, the control circuit 201 acquires distance information regarding an object. In step S1802, the control circuit 201 sets a focus position based on the distance information regarding the object and user's settings. As an example, a user may first use a touch panel to designate a region to bring into focus, and the control circuit 201 acquires distance information regarding the corresponding region and sets focus positions for images based on the region designated by the user.

In step S1803, the control circuit 201 captures images with the set focus positions which are changed by the optical system 203 and acquires distance information regarding each of the captured images.

In step S1804, the control circuit 201 determines whether camera shake including a movement in the optical axis direction has occurred during the capturing operation in step S1803 or not. More specifically, the control circuit 201 calculates the focus position for the capturing operation based on the distance information acquired in step S1804. The calculated focus position for the capturing operation and the set focus position are compared to determine whether camera shake has occurred or not. As an example, a threshold value for a difference in focus position may be defined, and if the difference between the calculated focus position for a capturing operation and a set focus position is equal to or higher than the threshold value, it may be determined that camera shake has occurred. Alternatively, the apparatus movement detecting device 211 may detect a movement of the image capture apparatus during a capturing operation and, if the width of the movement is equal to or higher than a predetermined threshold value, it may be determined that camera shake has occurred. Determining the presence of camera shake from a movement of the image capture apparatus detected by the apparatus movement detecting device 211 can eliminate the necessity for the calculating of the focus position for the capturing operation in step S1804, and the focus position for the capturing operation is calculated in the processing of generating a refocused image in step S1805 instead.

Here, the control circuit 201 may detect fixing and, if it is detected that the digital camera is fixed to a fixing portion such as a tripod, it may be determined that camera shake does not occur.

If it is determined that camera shake has occurred, the processing moves to step S1805 where a refocused image is generated. If it is determined that camera shake has not occurred, the refocus processing is omitted, and, for reduction of the processing time, the processing directly moves to step S1806 where image combining is performed. The image combining in step S1806 generates a combined image in the same manner as that of the first embodiment.

Next, the generating of refocused image in step S1805 will be described in detail.

Figure 19:
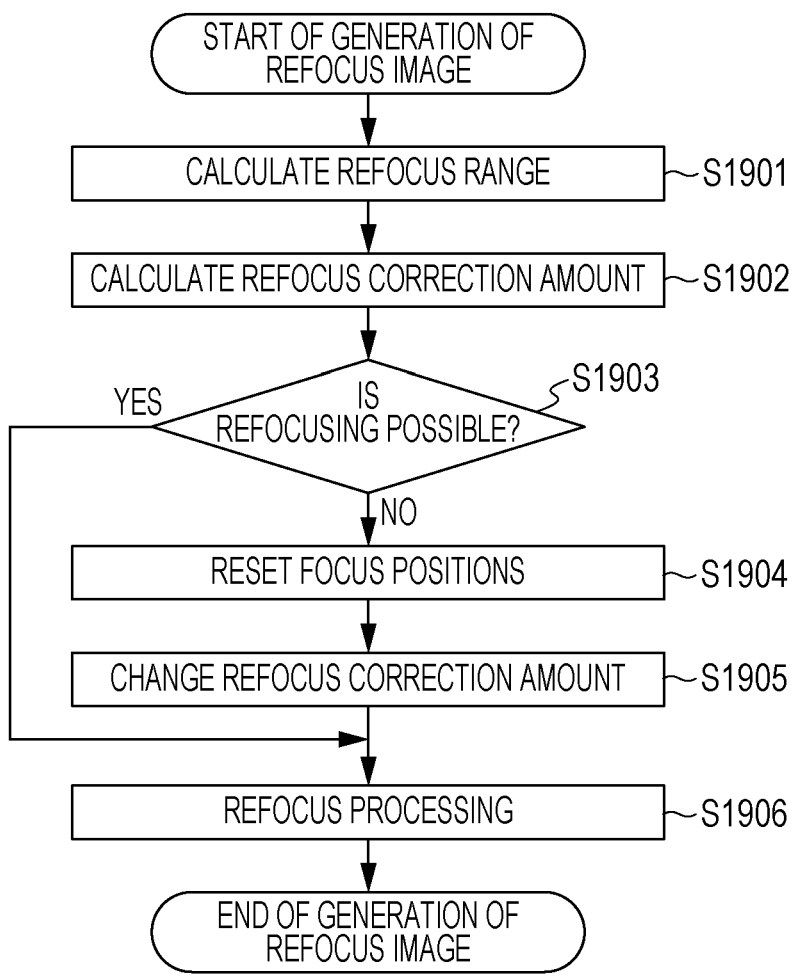
FIG. 19 is a flowchart illustrating generation of a refocused image according to the fourth embodiment.

FIG. 19 is a flowchart illustrating the generating of a refocused image according to this embodiment. In step S1901, the control circuit 201 calculates a refocus range, as described above. Next, the control circuit 201 calculates a refocus correction amount based on a difference between a set focus position and a focus position for the corresponding capturing operation. In step S1903, the control circuit 201 compares the refocus range and the refocus correction amount to determine where refocusing is possible or not. If the refocus correction amount exceeds the refocus range, it is determined that the refocusing is not possible, and the processing moves to step S1904. If the refocus correction amount is within the refocus range, it is determined that the refocusing is possible, and the processing directly moves to step S1906 where the image processing circuit 207 performs the refocus processing.

Figure 20:
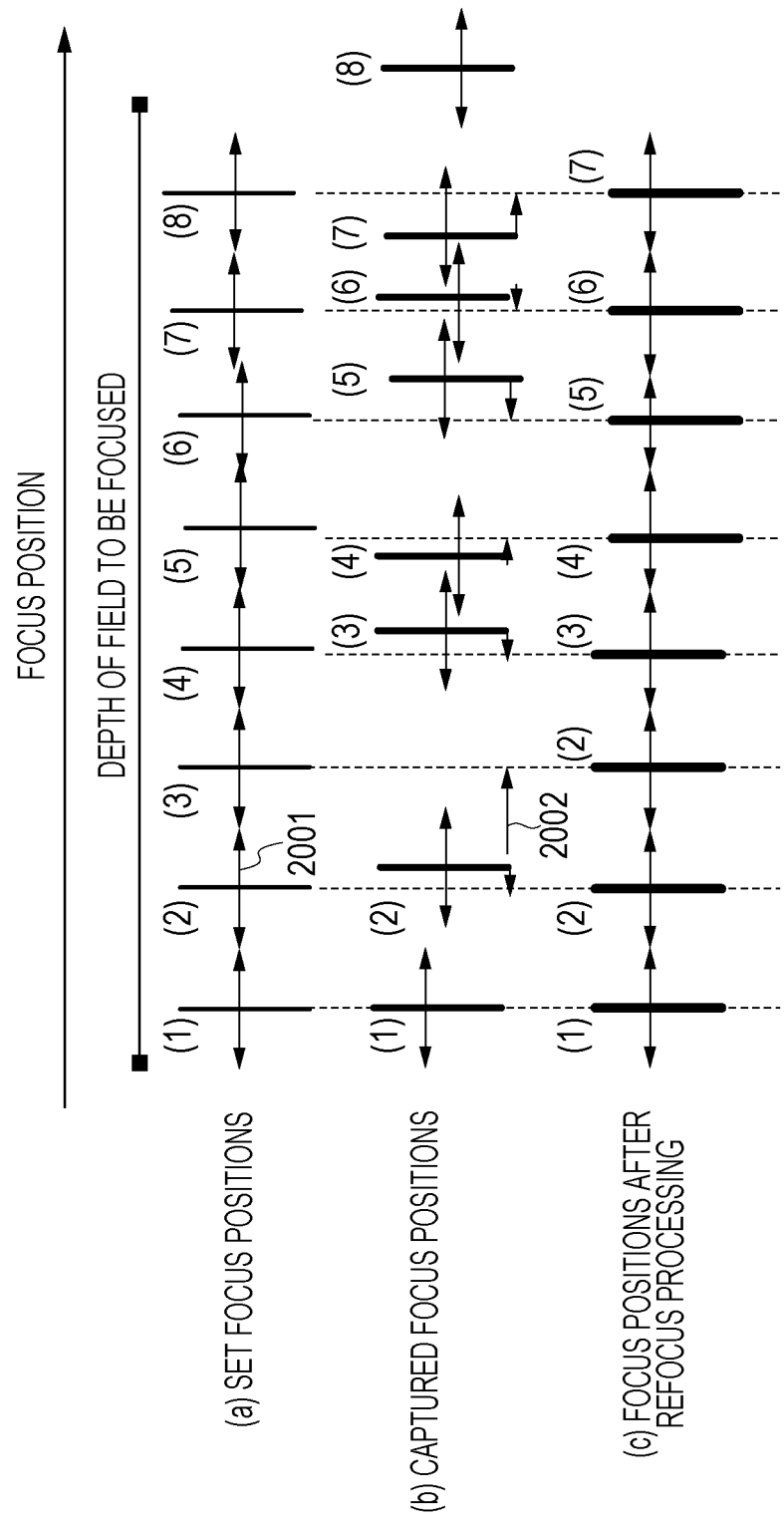
FIG. 20 illustrates an example of refocus processing in a case where it is determined that refocusing is possible in a step according to the fourth embodiment.
Figure 22A:
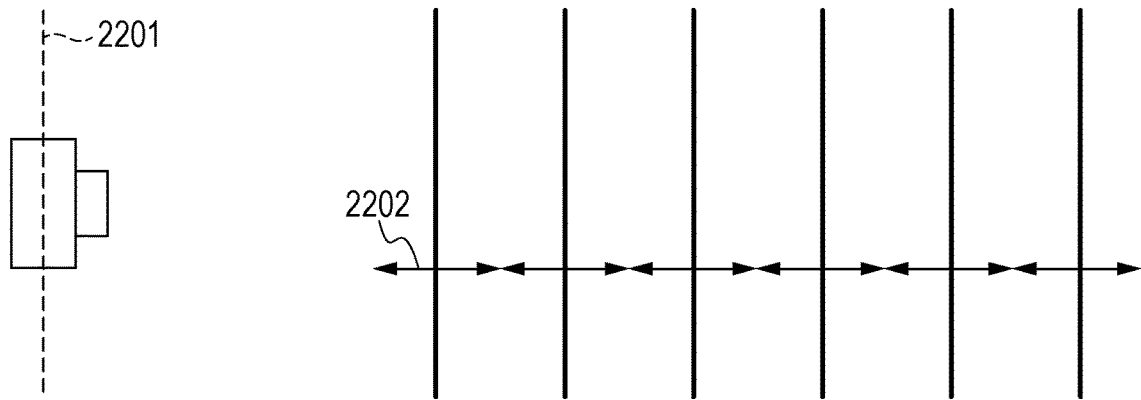
FIG. 22A illustrates a state without camera shake according to a prior art of focus stacking.
Figure 22B:
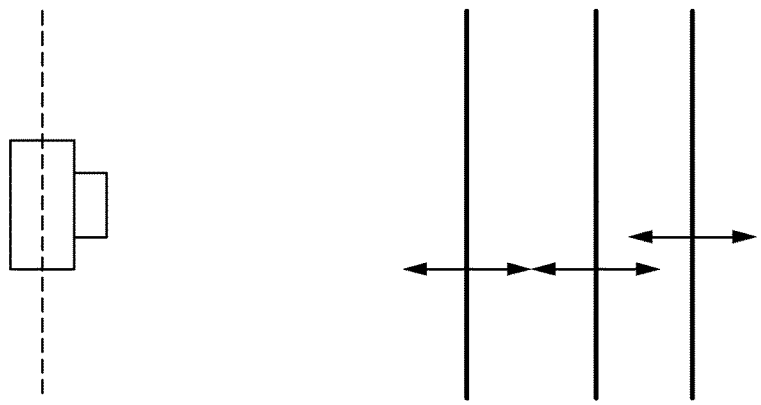
FIG. 22B illustrates a state with camera shake on a minimum-object-distance side according to the prior art of focus stacking.
Figure 22C:
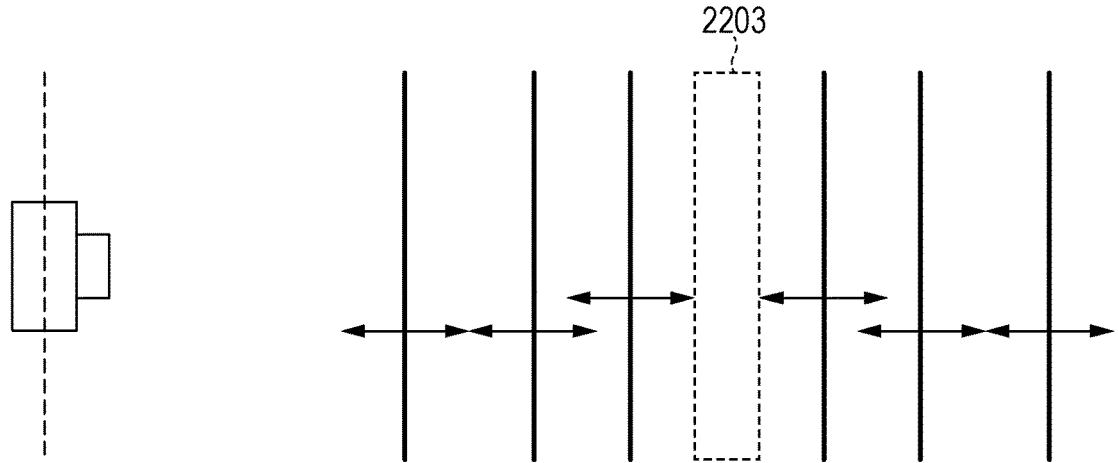
FIG. 22C illustrates a state with camera shake on an infinite end side according to the prior art of focus stacking.

FIG. 20 illustrates an example of the refocus processing in a case where it is determined in step S1903 that the refocusing is possible. FIG. 20 illustrates (a) indicating focus positions set by the control circuit 201 in step S1802. A range 2001 is a range with no part where an object is out of focus and is determined based on the focal length and the acceptable circle-of-confusion diameter of the image capture device. Referring to (a) in FIG. 20, a plurality of focus positions are set such that the ranges 2001 corresponding to the focus positions can be adjacent to each other or can be partially overlapped. FIG. 20 illustrates (b) indicating focus positions with which the image capture apparatus has actually captured. (b) indicates that all of the focus positions excluding the focus position for capturing the first image are displaced from the set focus positions. Between the focus position for capturing the second image and the focus position for capturing the third image, there is a region with a state that none of images are in focus in the second and third images. Because of this, even when these images are used as they are to generate a combined image, the resulting combined image may include a blurred region. Accordingly, refocusing is performed.

FIG. 20 illustrates (c) indicating focus positions after the refocus processing. The numbers given at the focus positions in (c) in FIG. 20 correspond to the numbers given to the focus positions in (b) in FIG. 20. For example, the focus position with a number 2 is used twice for refocus processing. A correction amount 2002 represents a refocus correction amount and indicates a difference in focus position between an image newly generated by refocus processing and an original image. As described above, a refocus correction may not be performed if the refocus correction amount is not within the refocus range. In a case where a target focus position is included in refocus ranges of a plurality of captured images, an image with a less refocus correction amount may be used to perform refocus processing. For example, the fourth focus position set as a target position may be within a refocus range of an image which should be captured with the third focus position and within a refocus range of an image which should be captured with the fourth focus position. In this case, the image which should be captured with the third focus position and which is to be corrected with a less refocus correction amount may be used for refocus processing.

If it is determined that the refocusing is possible in step S1903, the control circuit 201 advances the processing to step S1904 where a new focus position is added. Then, a new image is captured with the focus position. Next, in step S1905, the refocus correction amount is changed based on a difference between the focus position added in step S1904 and an actual focus position of the image which should be captured with the added focus position. Finally, the processing moves to step S1906 where refocus processing is performed.

FIG. 21 illustrates an example of resetting of focus positions and subsequent refocus processing in a case where it is determined in step S1903 that the refocusing not possible. FIG. 21 illustrates (a) indicating focus positions set by the control circuit 201 in step S1802. FIG. 21 further illustrates (b) indicating focus positions with which the image capture apparatus actually performs capturing operations. FIG. 21 further illustrates (c) indicating focus positions after the refocus processing is performed. The processing here resets the focus positions of the second and third images which are reconstructed at limit positions of their refocus ranges. Then, based on the focus positions set at limit positions of the refocus ranges, the focus positions of the plurality of images to be reconstructed are reset such that their focus positions can be arranged at equal intervals.

In a case where the control circuit 201 determines that refocusing to the initially set focus position is not possible as in FIG. 21, the focus position is reset within a refocusable range.

According to this embodiment, in a case where a plurality of images captured with different focus positions are to be combined, the focus positions are refocused to reduce influences of camera shake and so on for acquiring a combined image with higher quality.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183798 filed Sep. 21, 2016 and Japanese Patent Application No. 2016-19133 filed Sep. 29, 2016, which are hereby incorporated by reference herein in their entirety.

What is claimed is:
1. An image capture apparatus, comprising:
an image sensor;
a processor; and
a memory including instructions that, when executed by the processor, cause the processor to:
  set a plurality of target focus positions;
  cause the image sensor to capture a plurality of images based on the target focus positions; and
  calculate a focus position with respect to an object when each of the plurality of images is captured,
  wherein the instructions further cause the processor to:
  reset at least a part of the target focus positions based on a result of a comparison between the target focus positions and the calculated focus positions, and
  determine whether to add a new target focus position based on a distance between the calculated focus positions of two continuous capture operations.
2. The image capture apparatus according to claim 1, wherein the instructions further cause the processor to:
in a case where the image sensor is caused to capture a first image and a second image sequentially and where a difference between a focus position calculated for capture the first image and a focus position calculated for capturing the second image is higher than a predetermined threshold value, reset a part of the target focus positions for images to be captured subsequently.
3. The image capture apparatus according to claim 1, wherein the instructions further cause the processor to:
combine the plurality of images to generate a combined image.
4. The image capture apparatus according to claim 3, wherein the instructions further cause the processor to:
cause the plurality of images to overlap in at least a part of their field angles.
5. The image capture apparatus according to claim 3, wherein the instructions further cause the processor to:
generate the combined image by using focused regions of the plurality of images.

6. The image capture apparatus according to claim 1, wherein the image sensor has a plurality of photoelectric conversion units for one microlens.

7. The image capture apparatus according to claim 6, wherein the instructions further cause the processor to:
calculate focus positions with respect to an object in a case where the plurality of images is captured based on outputs of the plurality of photoelectric conversion units in the image sensor.

8. The image capture apparatus according to claim 1, wherein the instructions further cause the processor to:
detect contrast values of the plurality of images and calculate focus positions with respect to an object in the plurality of images based on the contrast values.

9. The image capture apparatus according to claim 1, further comprising a focus detection sensor, wherein the instructions further cause the processor to:
calculate focus positions with respect to an object in a case where the plurality of images is captured based on the focus detection sensor.

10. An image capture apparatus, comprising:
an image sensor having a sensor array having a plurality of photoelectric conversion units for one microlens;
a processor; and
a memory including instructions that, when executed by the processor, cause the processor to:
set a plurality of target focus positions;
cause the image sensor to capture a plurality of images based on the target focus positions; and
calculate a focus position with respect to an object when each of the plurality of images is captured,
wherein the instructions further cause the processor to:
reconstruct an image focused with respect to at least one target focus position by using at least a part of the plurality of images based on a difference between the plurality of target focus positions and the focus positions calculated with respect to the plurality of images, by calculating a refocus correction amount based on the difference between the plurality of target focus positions and the focus positions calculated with respect to the plurality of images.

11. The image capture apparatus according to claim 10, wherein the instructions further cause the processor to:
combine the plurality of images and at least a part of the reconstructed image to generate a combined image.

12. The image capture apparatus according to claim 11, wherein the instructions further cause the processor to:
cause the plurality of images to overlap in at least a part of their field angles.

13. The image capture apparatus according to claim 11, wherein the instructions further cause the processor to:
use focused regions of the plurality of images and the reconstructed image to generate the combined image.

14. The image capture apparatus according to claim 10, wherein the instructions further cause the processor to:
use an image with a calculated focus position closer to a first target focus position of the plurality of target focus positions among the plurality of images to reconstruct a focused image with respect to the first target focus position.

15. The image capture apparatus according to claim 10, wherein the instructions further cause the processor to:
in a case where a difference between a first target focus position of the plurality of target focus positions and a focus position calculated for a first image captured based on the first target focus position is equal to or higher than a threshold value, reconstruct an image focused with the first target focus position.

16. The image capture apparatus according to claim 10, further comprising a camera shake detection unit configured to detect camera shake information, wherein the instructions further cause the processor to:
reconstruct an image focused with respect to at least one target focus position in a case where the camera shake information is equal to or higher than a threshold value.

17. The image capture apparatus according to claim 10, wherein the instructions further cause the processor to:
in a case where an image having a focus position corresponding to a first target focus position of the plurality of target focus positions may not be reconstructed even by using any of the plurality of images, reset a target focus position based on the first target focus position and cause the image sensor to capture an image.

18. A method of controlling an image capture apparatus, comprising:
setting a plurality of target focus positions;
causing an image sensor to capture a plurality of images based on the target focus positions; and
calculating a focus position with respect to an object when each of the plurality of images is captured,
wherein at least a part of the target focus positions is reset based on a result of a comparison between the target focus positions and the calculated focus positions, and
it is determined whether to add a new target focus position based on a distance between the calculated focus positions of two continuous capture operations.

19. A method of controlling an image capture apparatus, comprising:
setting a plurality of target focus positions;
causing an image sensor having a sensor array having a plurality of photoelectric conversion units for one microlens to capture a plurality of images based on the target focus positions; and
calculating a focus position with respect to an object when each of the plurality of images is captured,
wherein an image focused with respect to at least one target focus position is reconstructed by using at least a part of the plurality of images based on a difference between the plurality of target focus positions and the focus positions calculated with respect to the plurality of images, by calculating a refocus correction amount based on the difference between the plurality of target focus positions and the focus positions calculated with respect to the plurality of images.

20. A non-transitory recording medium storing a program including instructions, which when executed by a computer of an image capture apparatus, cause the computer to perform a control method comprising:
setting a plurality of target focus positions;
causing an image sensor to capture a plurality of images based on the target focus positions; and
calculating a focus position with respect to an object when each of the plurality of images is captured,
wherein at least a part of the target focus positions is reset based on a result of a comparison between the target focus positions and the calculated focus positions, and
it is determined whether to add a new target focus position based on a distance between the calculated focus positions of two continuous capture operations.

21. A non-transitory recording medium storing a program including instructions, which when executed by a computer of an image capture apparatus, cause the computer to perform a control method comprising:

setting a plurality of target focus positions;
causing an image sensor having a sensor array having a plurality of photoelectric conversion units for one microlens to capture a plurality of images based on the target focus positions; and
calculating a focus position with respect to an object when each of the plurality of images is captured,
wherein an image focused with respect to at least one target focus position is reconstructed by using at least a part of the plurality of images based on a difference between the plurality of target focus positions and the focus positions calculated with respect to the plurality of images, by calculating a refocus correction amount based on the difference between the plurality of target focus positions and the focus positions calculated with respect to the plurality of images.

* * * * *